United States Patent
Xu et al.

(10) Patent No.: US 12,127,269 B2
(45) Date of Patent: Oct. 22, 2024

(54) RANDOM ACCESS METHOD AND COMMUNICATIONS APPARATUS

(71) Applicant: Huawei Technologies Co., Ltd., Shenzhen (CN)

(72) Inventors: Xiaoying Xu, Shanghai (CN); Qufang Huang, Shenzhen (CN); Chunhua You, Shanghai (CN); Yinghao Guo, Shanghai (CN); Li Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 17/510,065

(22) Filed: Oct. 25, 2021

(65) Prior Publication Data

US 2022/0046727 A1    Feb. 10, 2022

Related U.S. Application Data

(63) Continuation of application No. PCT/CN2020/086783, filed on Apr. 24, 2020.

(30) Foreign Application Priority Data

Apr. 26, 2019 (CN) .......................... 201910346571.3

(51) Int. Cl.
*H04W 4/00* (2018.01)
*H04B 17/318* (2015.01)
(Continued)

(52) U.S. Cl.
CPC ...... *H04W 74/0841* (2013.01); *H04B 17/318* (2015.01); *H04W 52/242* (2013.01); *H04W 52/367* (2013.01); *H04W 74/0866* (2013.01)

(58) Field of Classification Search
CPC .............. H04B 17/318; H04W 52/242; H04W 52/367; H04W 52/50; H04W 72/23;
(Continued)

(56) References Cited

U.S. PATENT DOCUMENTS

2015/0003375 A1* 1/2015 Liu ...................... H04L 5/0044
370/329
2019/0320467 A1* 10/2019 Freda .................. H04W 74/004
(Continued)

FOREIGN PATENT DOCUMENTS

WO      2018064367 A1    4/2018

OTHER PUBLICATIONS

3GPP TS 36.321; ETSI TS 136 321 V13.4.0 (Feb. 2017); LTE; E-UTRA; Medium Access Control (MAC) protocol specification, retrieved Feb. 29, 2024. (Year: 2017).*

(Continued)

*Primary Examiner* — Edan Orgad
*Assistant Examiner* — Hidayat Dabiri
(74) *Attorney, Agent, or Firm* — Leydig, Voit & Mayer, Ltd.

(57) ABSTRACT

This application provides a random access method and a communications apparatus. The method includes: determining at least one random access preamble from at least one 2-step random access preamble, or determining one type of random access preamble from at least one 2-step random access preamble and at least one 4-step random access preamble, and performing random access by using the determined random access preamble. According to the application, the terminal device can determine a type of random access to be performed, thereby reducing an access latency.

17 Claims, 4 Drawing Sheets

(51) Int. Cl.
  *H04W 52/24* (2009.01)
  *H04W 52/36* (2009.01)
  *H04W 74/08* (2009.01)
  *H04W 74/0833* (2024.01)
(58) Field of Classification Search
  CPC ............. H04W 74/004; H04W 74/006; H04W 74/0833; H04W 74/0836; H04W 74/0838; H04W 74/0841; H04W 74/0866
  See application file for complete search history.

(56) References Cited

U.S. PATENT DOCUMENTS

| | | | | |
|---|---|---|---|---|
| 2019/0357265 | A1* | 11/2019 | Ren | H04W 72/0453 |
| 2020/0267768 | A1* | 8/2020 | Hakola | H04L 5/0091 |
| 2020/0329505 | A1* | 10/2020 | Shan | H04W 72/52 |
| 2021/0195584 | A1* | 6/2021 | You | H04L 5/0053 |
| 2022/0124828 | A1* | 4/2022 | Uchino | H04W 74/0833 |
| 2022/0141886 | A1* | 5/2022 | Takahashi | H04W 74/0841 370/329 |
| 2023/0232444 | A1* | 7/2023 | Hong | H04W 74/004 370/329 |

OTHER PUBLICATIONS

"2-step random access procedure," 3GPP TSG RAN WG1 AH_NR Meeting, Spokane, USA, R1-1700703, Total 4 pages, 3rd Generation Partnership Project, Valbonne, France (Jan. 16-20, 2017).

"Remaining details on PRACH procedure," 3GPP TSG RAN WG1 Meeting 90bis, Prague, CZ, R1-1717582, Total 15 pages, 3rd Generation Partnership Project, Valbonne, France (Oct. 9-13, 2017).

"2-step RACH to 4-step RACH fallback," 3GPP TSG RAN WG2 NR Adhoc, Spokane, USA, R2-1700137, Total 3 pages, 3rd Generation Partnership Project, Valbonne, France (Jan. 17-19, 2017).

"2 Step RA: MsgA Aspects," 3GPP TSG-RAN2, 105bis, Xian, China, R2-1903112, Total 5 pages, 3rd Generation Partnership Project, Valbonne, France (Apr. 8-12, 2019).

InterDigital Communications, "Random Access Procedure," 3GPP TSG-RAN WG1 #87, Reno, USA, R1-1612311, total 4 pages, 3rd Generation Partnership Project, Valbonne, France (Nov. 14-18, 2016).

ZTE, Sanechips, "On 2-Step RACH Procedures," 3GPP TSG RAN WG1 Meeting #96bis, Xi'an, China, R1-1903879, total 10 pages, 3rd Generation Partnership Project, Valbonne, France (Apr. 8-12, 2019).

"3rd Generation Partnership Project; Technical Specification Group Radio Access Network;NR;Medium Access Control (MAC) protocol specification (Release 15)," 3GPP TS 38.321 V15.1.0, total 67 pages, 3rd Generation Partnership Project, Valbonne, France (Mar. 2018).

"3rd Generation Partnership Project; Technical Specification Group Radio Access Network; NR; Radio Resource Control (RRC) protocol specification (Release 15)," 3GPP TS 38.331 V15.5.1, total 491 pages, 3rd Generation Partnership Project, Valbonne, France (Apr. 2019).

\* cited by examiner

RANDOM ACCESS METHOD AND COMMUNICATIONS APPARATUS

CROSS-REFERENCE TO RELATED APPLICATIONS

This application is a continuation of International Application No. PCT/CN2020/086783, filed on Apr. 24, 2020, which claims priority to Chinese Patent Application No. 201910346571.3, filed on Apr. 26, 2019. The disclosures of the aforementioned applications are hereby incorporated by reference in their entireties.

TECHNICAL FIELD

Embodiments of this application relate to the communications field, and more specifically, to a random access method and a communications apparatus.

BACKGROUND

In a wireless communications technology, a terminal device implements uplink synchronization with a network device by using a random access process. Currently, random access types include 4-step random access and 2-step random access. The network device may configure both a random access channel (RACH) resource used for 4-step random access and a RACH resource used for 2-step random access. In this scenario, the terminal device cannot determine a type of random access that needs to be performed.

SUMMARY

This application provides a random access method and a communications apparatus, so that a terminal device can determine a type of random access to be performed.

According to a first aspect, a random access method is provided, including: determining a random access preamble; and performing random access by using the random access preamble.

The random access preamble is at least one random access preamble determined from at least one 2-step random access preamble, or the random access preamble is one type of random access preamble determined from at least one 2-step random access preamble and at least one 4-step random access preamble. The at least one 2-step random access preamble is a random access preamble that is configured by a network device and that is used for 2-step random access. The at least one 4-step random access preamble is a random access preamble that is configured by the network device and that is used for 4-step random access.

According to the method provided in this application, when the network device configures both the random access preamble used for 4-step random access and the random access preamble used for 2-step random access, a terminal device may select a 2-step random access preamble to perform 2-step random access, or a terminal device may randomly select a type of random access preamble from the configured 2-step random access preamble and the configured 4-step random access preamble, to perform a corresponding type of random access.

Optionally, the random access is used for initial data transmission, or is used for data retransmission.

In other words, in a case of initial data transmission, the random access preamble is used to perform random access. Alternatively, in a case of data retransmission, the random access preamble is used to perform random access.

With reference to the first aspect, in some implementations of the first aspect, when the random access is used for initial data transmission, the method may further include: performing 2-step random access when the random access fails.

Because 2-step random access requires shorter time than 4-step random access, an access latency can be reduced by using 2-step random access.

With reference to the first aspect, in some implementations of the first aspect, when the random access is used for data retransmission, the method may further include: performing 2-step random access or 4-step random access when the random access fails.

According to this solution, when the random access used for data retransmission fails, the terminal device may flexibly select a random access type.

With reference to the first aspect, in some implementations of the first aspect, when the random access fails, the method may further include: receiving indication information sent by a network device, where the indication information is used to indicate a terminal device to perform 2-step random access, or the indication information is used to indicate a terminal device to perform 4-step random access; and performing random access based on the indication information.

According to this solution, the terminal device may determine the random access type based on an indication of the network device.

With reference to the first aspect, in some implementations of the first aspect, the random access preamble is a 2-step random access preamble, the at least one 2-step random access preamble corresponds to at least one first data amount threshold, a first data amount threshold corresponding to a 2-step random access preamble is a maximum data sending amount supported by the 2-step random access preamble, and each first data amount threshold corresponds to one second signal strength threshold; and the determining a random access preamble includes:

if a reference signal whose corresponding reference signal received power (RSRP) is greater than a first signal strength threshold exists in at least one reference signal configured by the network device, selecting a target reference signal from the reference signal whose corresponding RSRP is greater than the first signal strength threshold, where the reference signal is a synchronization signal block (SSB) or a channel state information-reference signal (CSI-RS); and if an amount of to-be-transmitted data is less than or equal to one of the at least one first data amount threshold, and an RSRP of the target reference signal is greater than a target second signal strength threshold, determining the random access preamble from a 2-step random access preamble corresponding to the target reference signal, where a first data amount threshold corresponding to the random access preamble is a first data amount threshold corresponding to the target second signal strength threshold, and the target second signal strength threshold is a second signal strength threshold that corresponds to a first data amount threshold corresponding to the amount of to-be-transmitted data; or the random access preamble supports the amount of to-be-transmitted data.

According to this solution, the target reference signal may be first selected according to a current technology, and then the random access preamble is determined based on a relationship between an amount of to-be-transmitted data and a first data amount threshold and a relationship between an RSRP corresponding to a target reference signal and a second signal strength threshold.

In an alternative solution of this solution, the target reference signal may alternatively not be selected, but the random access preamble is directly determined based on a random access preamble corresponding to a reference signal whose corresponding RSRP is greater than the target second signal strength threshold in the at least one reference signal. For example, a random access preamble that supports the amount of to-be-transmitted data may be directly selected, as the random access preamble, from the random access preamble corresponding to the reference signal whose corresponding RSRP is greater than the target second signal strength threshold. A random access preamble corresponding to a specific reference signal may not include a 2-step random access preamble. Therefore, in comparison with the foregoing solution in which the target reference signal is first selected and then the random access preamble is determined, a probability of selecting a 2-step random access preamble can be improved in this solution.

It should be understood that there is a correspondence between a random access preamble and a physical uplink shared channel (PUSCH) resource, and a PUSCH resource corresponds to a size of a maximum transmitted data block, namely, a maximum transport block size (TBS). It may be considered that the random access preamble corresponds to a TBS, and this means that when an amount of to-be-sent data is less than (or equal to) the TBS, a random access preamble corresponding to the TBS may be used. Therefore, a data amount supported by a random access preamble is a TBS that corresponds to a PUSCH resource corresponding to the random access preamble.

With reference to the first aspect, in some implementations of the first aspect, the random access preamble is a 2-step random access preamble, the at least one 2-step random access preamble corresponds to at least one first data amount threshold, a first data amount threshold corresponding to a 2-step random access preamble is a maximum data sending amount supported by the 2-step random access preamble, each first data amount threshold corresponds to one value of PL1, and PL1 is a first path loss threshold; and the determining a random access preamble includes:

if a reference signal whose corresponding reference signal received power (RSRP) is greater than a first signal strength threshold exists in at least one reference signal configured by the network device, selecting a target reference signal from the reference signal whose corresponding RSRP is greater than the first signal strength threshold, where the reference signal is a synchronization signal block (SSB) or a channel state information-reference signal (CSI-RS); and if an amount of to-be-transmitted data is less than or equal to one of the at least one first data amount threshold, and a path loss corresponding to the target reference signal is less than a target value of PL1, determining the random access preamble from a 2-step random access preamble corresponding to the target reference signal.

The target value of PL is a second signal strength threshold that corresponds to a first data amount threshold corresponding to the amount of to-be-transmitted data, or a first data amount threshold corresponding to the random access preamble is a first data amount threshold corresponding to a target second signal strength threshold. Alternatively, the random access preamble supports the amount of to-be-transmitted data. $PL1=PCMAX-TP-\Delta1$, PL1 is the first path loss threshold, PCMAX is a maximum transmit power of the terminal device in a cell in which the terminal device performs random access, TP is a target receive power of the 2-step random access preamble, $\Delta1$ is a power deviation between the to-be-sent data and the 2-step random access preamble, and the target value of PL1 is a value that is of PL1 and that corresponds to the first data amount threshold corresponding to the amount of to-be-transmitted data.

According to this solution, the target reference signal may be first selected according to a current technology, and then the random access preamble is determined based on a relationship between an amount of to-be-transmitted data and a first data amount threshold and a relationship between a path loss corresponding to a target reference signal and a value of PL1.

In an alternative solution of this solution, the target reference signal may alternatively not be selected, but the random access preamble is directly determined based on a random access preamble corresponding to a reference signal whose corresponding path loss is less than the target value of PL1 in the at least one reference signal. For example, a random access preamble that supports the amount of to-be-transmitted data may be directly selected, as the random access preamble, from the random access preamble corresponding to the reference signal whose corresponding path loss is less than the target value of PL1. A random access preamble corresponding to a specific reference signal may not include a 2-step random access preamble. Therefore, a probability of selecting a 2-step random access preamble can be improved in this solution.

With reference to the first aspect, in some implementations of the first aspect, the random access preamble is a 2-step random access preamble; and the determining a random access preamble includes:

if a reference signal whose corresponding reference signal received power (RSRP) is greater than a first signal strength threshold exists in at least one reference signal configured by the network device, selecting a target reference signal from the reference signal whose corresponding RSRP is greater than the first signal strength threshold, where the reference signal is a synchronization signal block (SSB) or a channel state information-reference signal (CSI-RS);

determining whether a first group of random access preambles are configured, where a data sending amount supported by the first group of random access preambles is greater than a second data amount threshold; and if the first group of random access preambles are configured, an amount of to-be-transmitted data is greater than the second data amount threshold, and a path loss corresponding to the target reference signal is less than a value of PL2, determining the random access preamble from a random access preamble that is in the first group of random access preambles and that corresponds to the target reference signal;

if the first group of random access preambles are configured, and an amount of to-be-transmitted data is less than or equal to the second data amount threshold, determining the random access preamble from a random access preamble that is in a second group of random access preambles and that corresponds to the target reference signal, where a maximum data sending amount supported by the second group of random access preambles is the second data amount threshold; or if the first group of random access preambles are configured, and a path loss corresponding to the target reference signal is greater than or equal to a value of PL2, determining the random access preamble from a random access preamble that is in a second group of random access preambles and that corresponds to the target reference signal, where PL2=PCMAX−TP−Δ1−Δ2, PL2 is a second path loss threshold, PCMAX is a maximum transmit power of the terminal device in a cell in which the terminal device performs random access, TP is a target receive power of a random access preamble for 2-step random access, Δ1 is a power deviation between the to-be-sent data and the 2-step random access preamble, and Δ2 is a power deviation between the first group of random access preambles and the second group of random access preambles.

According to this solution, the random access preamble may be selected from the first group of random access preambles to perform random access, or the random access preamble may be selected from the second group of random access preambles to perform random access.

It should be understood that the first group of random access preambles and the second group of random access preambles are 2-step random access preambles. The at least one random access preamble includes the first group of random access preambles and the second group of random access preambles.

With reference to the first aspect, in some implementations of the first aspect, the random access preamble is a 2-step random access preamble; and the determining a random access preamble includes:

if a reference signal whose corresponding reference signal received power (RSRP) is greater than a first signal strength threshold exists in at least one reference signal configured by the network device, selecting a target reference signal from the reference signal whose corresponding RSRP is greater than the first signal strength threshold, where the reference signal is a synchronization signal block (SSB) or a channel state information-reference signal (CSI-RS);

determining whether a first group of random access preambles are configured, where a data sending amount supported by the first group of random access preambles is greater than a second data amount threshold; and if the first group of random access preambles are configured, an amount of to-be-transmitted data is greater than the second data amount threshold, and the to-be-transmitted data is carried on a common control channel (CCCH), determining the random access preamble from a random access preamble that is in the first group of random access preambles and that corresponds to the target reference signal, where a maximum data sending amount supported by a second group of random access preambles is the second data amount threshold;

if the first group of random access preambles are configured, and an amount of to-be-transmitted data is less than or equal to the second data amount threshold, determining the random access preamble from a random access preamble that is in a second group of random access preambles and that corresponds to the target reference signal; or if the first group of random access preambles are configured, and to-be-transmitted data is not carried on a CCCH, determining the random access preamble from a random access preamble that is in a second group of random access preambles and that corresponds to the target reference signal.

According to this solution, the random access preamble may be selected from the first group of random access preambles to perform random access, or the random access preamble may be selected from the second group of random access preambles to perform random access.

With reference to the first aspect, in some implementations of the first aspect, the random access preamble is a 2-step random access preamble; and the determining a random access preamble includes:

if the first group of random access preambles are not configured, determining the random access preamble from the random access preamble that is in the second group of random access preambles and that corresponds to the target reference signal.

With reference to the first aspect, in some implementations of the first aspect, the random access preamble is a 2-step random access preamble, the at least one 2-step random access preamble corresponds to at least one first data amount threshold, a first data amount threshold corresponding to a 2-step random access preamble is a maximum data sending amount supported by the 2-step random access preamble, and each first data amount threshold corresponds to one second signal strength threshold; and the determining a random access preamble includes:

if an amount of to-be-transmitted data is less than or equal to one of the at least one first data amount threshold, and a reference signal whose corresponding reference signal received power (RSRP) is greater than a target second signal strength threshold exists in at least one reference signal configured by the network device, selecting a target reference signal from the reference signal whose corresponding RSRP is greater than the second signal strength threshold, where the reference signal is a synchronization signal block (SSB) or a channel state information-reference signal (CSI-RS), and the target second signal strength is a second signal strength threshold that corresponds to a first data amount threshold corresponding to the amount of to-be-transmitted data; and determining the random access preamble from a 2-step random access preamble corresponding to the target reference signal.

The target second signal strength threshold is the second signal strength threshold that corresponds to the first data amount threshold corresponding to the amount of to-be-transmitted data, or a first data amount threshold corresponding to the random access preamble is a first data amount threshold corresponding to the target second signal strength threshold. Alternatively, the random access preamble supports the amount of to-be-transmitted data.

According to this solution, the random access preamble may be determined based on a relationship between an amount of to-be-transmitted data and a first data amount threshold, and a relationship between an RSRP corresponding to a target reference signal and a second signal strength threshold. Compared with a solution in which a reference signal is selected based on the first signal strength threshold, and then the random access preamble is selected based on a relationship between the reference signal and the second signal strength threshold, this solution is implemented easier.

With reference to the first aspect, in some implementations of the first aspect, the random access preamble is a 2-step random access preamble, the at least one 2-step random access preamble corresponds to at least one first data amount threshold, a first data amount threshold corresponding to a 2-step random access preamble is a maximum data sending amount supported by the 2-step random access preamble, and each first data amount threshold corresponds to one second signal strength threshold; and the determining a random access preamble includes: if an amount of to-be-transmitted data is less than or equal to one of the at least one first data amount threshold, and a reference signal whose corresponding reference signal received power (RSRP) is greater than a target second signal strength threshold exists in at least one reference signal configured by the network device, selecting the random access preamble from a random access preamble corresponding to the reference signal whose corresponding RSRP is greater than the second signal strength threshold, where the reference signal is a synchronization signal block (SSB) or a channel state information-reference signal (CSI-RS), and the target second signal strength is a second signal strength threshold that corresponds to a first data amount threshold corresponding to the amount of to-be-transmitted data. The target second signal strength threshold is the second signal strength threshold that corresponds to the first data amount threshold corresponding to the amount of to-be-transmitted data, or a first data amount threshold corresponding to the random access preamble is a first data amount threshold corresponding to the target second signal strength threshold. Alternatively, the random access preamble supports the amount of to-be-transmitted data.

A random access preamble corresponding to a specific reference signal may not include a 2-step random access preamble. Therefore, in comparison with the foregoing solution in which the target reference signal is first selected and then the random access preamble is determined, a probability of selecting a 2-step random access preamble can be improved in this solution.

With reference to the first aspect, in some implementations of the first aspect, the performing random access by using the random access preamble includes: determining a next available sending occasion from a sending occasion corresponding to the target reference signal, where the sending occasion is used to send the random access preamble; and performing random access on the available sending occasion by using the random access preamble.

According to a second aspect, a random access method is provided. The method includes: generating configuration information; and sending the configuration information to a terminal device. The configuration information includes at least one first data amount threshold and at least one second signal strength threshold, the at least one first data amount threshold corresponds to at least one 2-step random access preamble, a first data amount threshold corresponding to a 2-step random access preamble is a maximum data sending amount supported by the 2-step random access preamble, each first data amount threshold corresponds to one second signal strength threshold, and the configuration information is used by the terminal device to determine a random access preamble to perform random access.

According to a third aspect, a communications apparatus is provided, including a processing unit and a transceiver unit. The processing unit and the transceiver unit may be configured to perform corresponding steps of the method in any one of the first aspect and the possible implementations of the first aspect.

According to a fourth aspect, a communications apparatus is provided, including a processor. The processor is coupled to a memory, and may be configured to execute instructions in the memory, to implement the method in any one of the first aspect or the possible implementations of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver, or an input/output interface.

In another implementation, the communications apparatus is a chip configured in the terminal device. When the communications apparatus is a chip configured in the terminal device, the communications interface may be an input/output interface.

Optionally, the transceiver may be a transceiver circuit. Optionally, the input/output interface may be an input/output circuit.

According to a fifth aspect, a communications apparatus is provided, including a processing unit and a transceiver unit. The processing unit and the transceiver unit may be configured to perform corresponding steps of the method in any one of the second aspect and the possible implementations of the second aspect.

According to a sixth aspect, a communications apparatus is provided, including a processor. The processor is coupled to a memory, and may be configured to execute instructions in the memory, to implement the method in any one of the second aspect or the possible implementations of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver, or an input/output interface.

In another implementation, the communications apparatus is a chip configured in the network device. When the communications apparatus is a chip configured in the network device, the communications interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to: receive a signal by using the input circuit, and transmit a signal by using the output circuit, so that the processor performs the method in any one of the first aspect, the second aspect, the possible implementations of the first aspect, and the possible implementations of the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be, for example, but not limited to, output to a transmitter and transmitted by the transmitter. The input circuit and the output circuit may be a same circuit, and the circuit is respectively used as the input circuit and the output circuit at different moments. Specific implementations of the processor and various circuits are not limited in this embodiment of this application.

According to an eighth aspect, a processing apparatus is provided, including a processor and a memory. The processor is configured to read instructions stored in the memory, receive a signal by using a receiver, and transmit a signal by using a transmitter, to perform the method in any one of the first aspect, the second aspect, the possible implementations of the first aspect, and the possible implementations of the second aspect.

Optionally, there is one or more processors, and there is one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that a related data exchange process, for example, sending measurement configuration information, may be a process in which the processor outputs the measurement configuration information, and receiving information may be a process in which the processor receives information. Specifically, data output by the processor may be output to the transmitter, and input data received by the processor may come from the receiver. The transmitter and the receiver may be collectively referred to as a transceiver.

The processing apparatus in the eighth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general purpose processor, and is implemented by reading software code stored in the memory. The memory may be integrated in the processor, or may be located outside the processor and exist independently.

According to a ninth aspect, a computer program product is provided. The computer program product includes a computer program (which may also be referred to as code or instructions). When the computer program runs, a computer is enabled to perform the method in any one of the first aspect, the second aspect, the possible implementations of the first aspect, and the possible implementations of the second aspect.

According to a tenth aspect, a computer-readable medium is provided. The computer-readable medium stores a computer program (which may also be referred to as code or an instruction), and when the computer program is run on a computer, the computer is enabled to perform the method in any one of the first aspect, the second aspect, the possible implementations of the first aspect, and the possible implementations of the second aspect.

According to an eleventh aspect, a communications system is provided, including the network device and the terminal device.

DESCRIPTION OF EMBODIMENTS

Figure 1:
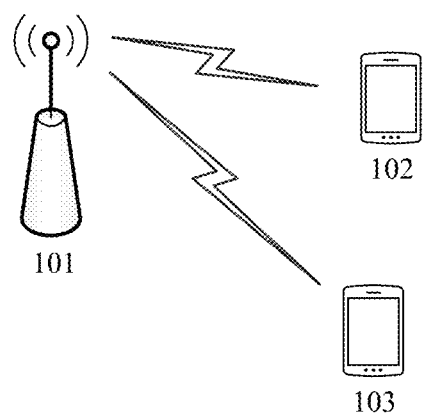
FIG. 1 is a schematic diagram of a communications system to which this application is applicable.

The following describes technical solutions of this application with reference to the accompanying drawings.

The technical solutions in the embodiments of this application may be applied to various communications systems such as an LTE time division duplex (TDD) system, a universal mobile telecommunication system (UMTS), a worldwide interoperability for microwave access (WiMAX) communications system, an ongoing 5th generation (5G) system, and a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be any device having a wireless transceiver function. The device includes but is not limited to a baseband unit (BBU), an access point (AP) in a wireless fidelity (Wi-Fi) system, a wireless relay node, a wireless backhaul node, a transmission point (TP) or a transmission and reception point (TRP), or the like, or may be a gNB or a transmission point (TRP or TP) in a 5th generation (5G) system, for example, new radio (NR), or one antenna panel or a group of antenna panels (including a plurality of antenna panels) of a base station in the 5G system, or may be a network node that constitutes the gNB or the transmission point, for example, a baseband unit (BBU) or a distributed unit (DU).

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implementing functions of a radio link control (RLC) layer, a media access control (MAC) layer, and a physical (PHY) layer. The AAU performs some physical layer processing functions, a related function of radio frequency processing, and a related function of an active antenna. Information at the RRC layer eventually becomes information at the PHY layer, or is converted from the information at the PHY layer. Therefore, in this architecture, it may also be considered that higher layer signaling such as RRC layer signaling is sent by the DU, or sent by the DU+AAU. It may be understood that the network device may be a device including one or more of a CU node, a DU node, and an AAU node. In addition, the CU may be classified as a network device in an access network (RAN), or the CU may be classified as a network device in a core network (CN). This is not limited in this application.

FIG. 1 is an architectural diagram of a communications system to which an embodiment of this application is applied. As shown in FIG. 1, the wireless communications system may include at least one network device 101, and the network device 101 communicates with one or more terminal devices (for example, a terminal device 102 and a terminal device 103 in FIG. 1). When the network device sends a signal, the network device is a transmit end, and the terminal device is a receive end. On the contrary, when the terminal device sends a signal, the terminal device is a transmit end, and the network device is a receive end.

For ease of understanding the technical solutions of this application, related technologies involved in this application are first described briefly.

After selecting a proper cell to complete camping, the terminal device may perform random access.

Figure 2:
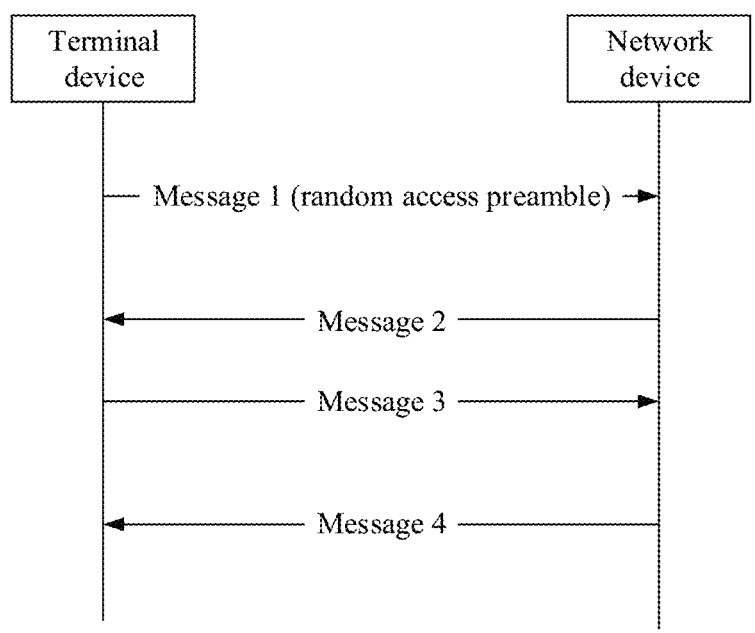
FIG. 2 is a schematic diagram of a random access process of a 4-step random access type.

FIG. 2 is a schematic diagram of a random access process of a 4-step random access type. As shown in FIG. 2, a terminal device sends a message 1 (msg 1) to a network device. The message 1 is a random access preamble. After detecting the random access preamble, the network device returns a response message, namely, a message 2 (msg 2), to the terminal device. The message 2 includes an uplink resource allocated by the network device to the terminal device. After receiving the message 2, the terminal device sends a message 3 on the uplink resource indicated by the message 2. If the network device can correctly decode the message 3, the network device returns a message 4 to the terminal device. The message 4 is used to notify the terminal device that contention succeeds. After the foregoing four steps are performed, the random access process succeeds.

With introduction of a new wireless terminal type such as machine type communication (MTC) or narrowband internet of things (NB-IoT), a quantity of terminal devices increases exponentially. If all terminal devices perform random access by using the 4-step random access type, the network device is overloaded. In addition, a 4-step random access latency is also relatively long.

To resolve these problems, a 2-step random access type is introduced.

Figure 3:
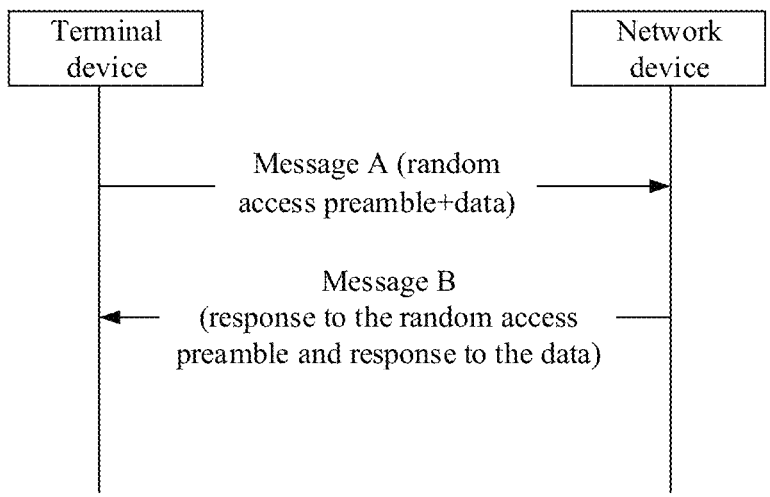
FIG. 3 is a schematic diagram of a random access process of a 2-step random access type.

FIG. 3 is a schematic diagram of a random access process of a 2-step random access type. In the 2-step random access process, a terminal device uses a message A to carry both a random access preamble and data (preamble+data). The data part is usually a radio resource control (RRC) message. If there is no conflict between terminal devices, a network device returns a message B to the terminal device after successfully decoding the message A. The message B includes both a response to the random access preamble and a response to the data. The response to the random access preamble is a random access response (RAR). The response to the data is usually an RRC message. The two responses may be sent simultaneously or sequentially. The terminal device may independently decode the two responses. After receiving the message B, the terminal device learns that random access succeeds. If there is a conflict between terminal devices, the network device may not be able to successfully obtain the data in the message A through decoding. In this case, the network device does not send the message B to the terminal device. After sending the message A, if the terminal device does not receive the message B after a time window, it is considered that random access fails.

In some cases, the terminal device sends the message A on a sending occasion configured for 2-step random access. To be specific, the message A includes the random access preamble and the data. If the network device can successfully decode only the random access preamble, but cannot successfully decode the data, the network device returns only the RAR to the terminal device, but does not return the response to the data. After receiving the RAR, the terminal device falls back to a 4-step random access process. To be specific, the terminal device resends a message 1 or a message 3. This process is referred to as a fallback from 2-step random access to 4-step random access.

Currently, the network device may configure both a random access preamble used for 4-step random access and a random access preamble used for 2-step random access. In this case, the terminal device cannot determine a type of random access that needs to be performed.

Therefore, this application provides a random access method, so that the terminal device determines a type of random access to be performed. According to the method provided in this application, when the network device configures both the random access preamble used for 4-step random access and the random access preamble used for 2-step random access, the terminal device may select a 2-step random access preamble to perform 2-step random access, or the terminal device may randomly select a type of random access preamble from the configured 2-step random access preamble and the configured 4-step random access preamble, to perform a corresponding type of random access.

Figure 4:
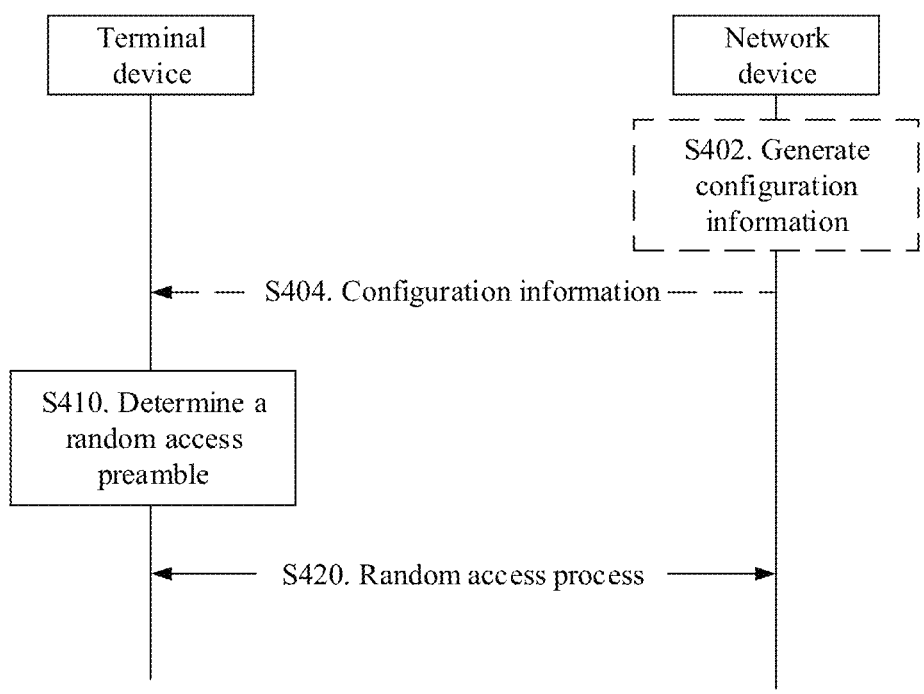
FIG. 4 is a schematic flowchart of a random access method according to this application.

The following describes in detail the random access method provided in this application with reference to FIG. 4. It should be noted that in this specification, the method provided in this application is described by using an example in which the method is performed by a terminal device or a network device. Actually, an operation performed by the terminal device may also be performed by a chip configured in the terminal device, and an operation performed by the network device may also be performed by a chip configured in the network device.

FIG. 4 is a schematic flowchart of a random access method 400 according to this application. The method 400 mainly includes S410 and S420. The steps are described below.

S410: A terminal device determines a random access preamble.

S420: The terminal device performs random access by using the determined random access preamble.

In the following, for distinction, the random access preamble determined by the terminal device is recorded as a target random access preamble.

The target random access preamble is at least one random access preamble determined from a 2-step random access preamble configured by a network device. Alternatively, the target random access preamble is one type of random access preamble determined from a 2-step random access preamble configured by a network device and a 4-step random access preamble configured by the network device. In other words, the target random access preamble is one type of random access preamble in the 2-step random access preamble and the 4-step random access preamble. The network device configures at least one 2-step random access preamble, and the network device configures at least one 4-step random access preamble. The 2-step random access preamble is used for 2-step random access, and the 4-step random access preamble is used for 4-step random access.

If the target random access preamble determined by the terminal device is a 2-step random access preamble, the terminal device performs 2-step random access. If the target random access preamble determined by the terminal device is a 4-step random access preamble, the terminal device performs 4-step random access.

According to the method provided in this application, when the network device configures both the random access preamble used for 4-step random access and the random access preamble used for 2-step random access, the terminal device may select a 2-step random access preamble to perform 2-step random access, or the terminal device may randomly select a type of random access preamble from the configured 2-step random access preamble and the configured 4-step random access preamble, to perform a corresponding type of random access.

Optionally, before S410, the method may further include the following steps:

S402: The network device generates configuration information.

S404: The network device sends the configuration information to the terminal device. Correspondingly, the terminal device receives the configuration information sent by the network device.

Specifically, the network device may configure a reference signal set based on the configuration information or other configuration information. The reference signal set may include an SSB set and a CSI-RS set. The network device may configure, based on the configuration information, a RACH resource corresponding to each SSB in the SSB set and a RACH resource corresponding to each CSI-RS in the CSI-RS set. Usually, the network device may configure a same corresponding RACH resource or different corresponding RACH resources for any two SSBs or CSI-RSs. The network device may configure a same corresponding RACH resource or different corresponding RACH resources for any SSB.

In addition, RACH resources corresponding to each SSB may include a 2-step RACH resource and a 4-step RACH resource. Alternatively, RACH resources corresponding to some SSBs may be 2-step RACH resources, and RACH resources corresponding to the other SSBs may be 4-step RACH resources. The 2-step RACH resource includes a 2-step random access preamble and a sending occasion for 2-step random access, and the sending occasion for 2-step random access is used to send the 2-step random access preamble. The 4-step RACH resource includes a 4-step random access preamble and a sending occasion for 4-step random access, and the sending occasion for 4-step random access is used to send the 4-step random access preamble. The sending occasion includes at least one of a time domain resource and a frequency domain resource.

Optionally, the sending occasion for 2-step random access and the sending occasion for 4-step random access may be shared. In other words, a configured sending occasion for 2-step random access is the same as a configured sending occasion for 4-step random access. However, this is not limited in this application. In an implementation, if the sending occasion for 2-step random access is not explicitly configured, but the 2-step random access preamble is configured, it is considered that the sending occasion for 2-step random access is the same as the configured sending occasion for 4-step random access.

In another implementation, if the 2-step random access preamble is not explicitly indicated, it is considered that the 2-step random access preamble and the 4-step random access preamble are the same. For example, if the 2-step random access preamble is not explicitly configured, but the sending occasion for 2-step random access is configured, it is considered that the 2-step random access preamble is the same as the configured 4-step random access preamble.

Usually, the sending occasion for 2-step random access and the sending occasion for 4-step random access that are configured by the network device may be different or may be the same. At a same time, a 2-step random access preamble and a 4-step random access preamble that may be configured by the network device are different. However, a case in which the sending occasion for 2-step random access and the sending occasion for 4-step random access that are configured by the network device are the same and the 2-step random access preamble and the 4-step random access preamble are the same is not excluded in this application.

It should be noted that, in this specification, that each SSB corresponds to a sending occasion and a random access preamble is only used as an example for description. Actually, some SSBs may correspond no sending occasion, and therefore, also correspond to no random access preamble.

The SSB is used as an example below to describe a possible correspondence between a reference signal and a RACH resource by using an example.

Correspondence 1

Each SSB corresponds to at least one sending occasion, and any two SSBs correspond to a same sending occasion, or any two SSBs correspond to different sending occasions. It should be understood that, that the any two SSBs correspond to different sending occasions indicates that there is no intersection set between sending occasions corresponding to the any two SSBs. A similar expression in the following also indicates a similar meaning, and is not described below again. When the any two SSBs correspond to different sending occasions, the any two SSBs may correspond to equal quantities of sending occasions or unequal quantities of sending occasions. Each SSB corresponds to at least one 2-step random access preamble and at least one 4-step random access preamble, and the at least one 2-step random access preamble and the at least one 4-step random access preamble are different. In other words, there is no intersection set between the at least one 2-step random access preamble and the at least one 4-step random access preamble. A quantity of 2-step random access preambles and a quantity of 4-step random access preambles that correspond to one SSB may be equal or unequal. The any two SSBs may correspond to a same 2-step random access preamble or different 2-step random access preambles. The any two SSBs may correspond to equal quantities of 2-step random access preambles or unequal quantities of 2-step random access preambles. The any two SSBs may correspond to a same 4-step random access preamble or different 4-step random access preambles. The any two SSBs may correspond to equal quantities of 4-step random access preambles or unequal quantities of 4-step random access preambles. A 2-step random access preamble and a 4-step random access preamble that correspond to one SSB may share a sending occasion corresponding to the SSB.

Descriptions are provided below by using an example in which the SSB set includes a total of four SSBs.

For example, Table 1 shows a case in which different SSBs correspond to different sending occasions, different 2-step random access preambles, and different 4-step random access preambles.

TABLE 1

| SSB ID | Sending occasion ID | 2-step random access preamble ID | 4-step random access preamble ID |
|---|---|---|---|
| 1 | 0-7 | 0-3 | 4-7 |
| 2 | 8-15 | 8-11 | 12-15 |
| 3 | 16-23 | 16-19 | 20-23 |
| 4 | 24-31 | 24-27 | 28-31 |

For example, Table 2 shows a case in which different SSBs correspond to different sending occasions, a same 2-step random access preamble, and a same 4-step random access preamble. It should be understood that different SSBs may alternatively correspond to a same 2-step random access preamble, and correspond to different 4-step random access preambles. Alternatively, different SSBs may correspond to different 2-step random access preambles, and correspond to a same 4-step random access preamble.

TABLE 2

| SSB ID | Sending occasion ID | 2-step random access preamble ID | 4-step random access preamble ID |
|---|---|---|---|
| 1 | 0-7 | 0-3 | 4-7 |
| 2 | 8-15 | 0-3 | 4-7 |
| 3 | 16-23 | 0-3 | 4-7 |
| 4 | 24-31 | 0-3 | 4-7 |

For example, Table 3 shows a case in which different SSBs correspond to a same sending occasion, different 2-step random access preambles, and different 4-step random access preambles.

TABLE 3

| SSB ID | Sending occasion ID | 2-step random access preamble ID | 4-step random access preamble ID |
|---|---|---|---|
| 1 | 0-7 | 0-3 | 4-7 |
| 2 | 0-7 | 8-11 | 12-15 |
| 3 | 0-7 | 16-19 | 20-23 |
| 4 | 0-7 | 24-27 | 28-31 |

For example, Table 4 shows a case in which different SSBs correspond to a same sending occasion, a same 2-step random access preamble, and a same 4-step random access preamble.

TABLE 4

| SSB ID | Sending occasion ID | 2-step random access preamble ID | 4-step random access preamble ID |
|---|---|---|---|
| 1 | 0-7 | 0-3 | 4-7 |
| 2 | 0-7 | 0-3 | 4-7 |
| 3 | 0-7 | 0-3 | 4-7 |
| 4 | 0-7 | 0-3 | 4-7 |

Correspondence 2

Each SSB corresponds to at least one random access preamble, and the at least one random access preamble may be used for 2-step random access or may be used for 4-step random access. In other words, at least one random access preamble corresponding to an SSB is shared by 2-step random access and 4-step random access. Any two SSBs may correspond to a same random access preamble or different random access preambles. In different cases, the any two SSBs may correspond to a same quantity of random access preambles or different quantities of random access preambles.

Each SSB corresponds to at least one sending occasion for 2-step random access and at least one sending occasion for 4-step random access. The at least one sending occasion for 2-step random access and the at least one sending occasion for 4-step random access are different. A quantity of sending occasions for 2-step random access and a quantity of sending occasions for 4-step random access that correspond to one SSB may be equal or unequal. The any two SSBs may correspond to a same sending occasion for 2-step random access or different sending occasions for 2-step random access. The any two SSBs may correspond to equal quantities of sending occasions for 2-step random access or unequal quantities of sending occasions for 2-step random access. The any two SSBs may correspond to a same sending occasion for 4-step random access or different sending occasions for 4-step random access. The any two SSBs may correspond to equal quantities of sending occasions for 4-step random access or unequal quantities of sending occasions for 4-step random access. A sending occasion for 2-step random access and a sending occasion for 4-step random access that correspond to one SSB may share a random access preamble corresponding to the SSB.

For example, Table 5 shows a case in which the sending occasion for 2-step random access and the sending occasion for 4-step random access correspond to a same random access preamble.

TABLE 5

| SSB ID | Sending occasion ID for 2-step random access | Sending occasion ID for 4-step random access | Random access preamble ID |
|---|---|---|---|
| 1 | 0-3 | 4-7 | 0-7 |
| 2 | 0-3 | 4-7 | 8-15 |
| 3 | 0-3 | 4-7 | 16-23 |
| 4 | 0-3 | 4-7 | 24-31 |

For example, Table 6 shows another case in which the sending occasion for 2-step random access and the sending occasion for 4-step random access correspond to a same random access preamble.

TABLE 6

| SSB ID | Sending occasion ID for 2-step random access | Sending occasion ID for 4-step random access | Random access preamble ID |
|---|---|---|---|
| 1 | 0-3 | 16-19 | 0-7 |
| 2 | 4-7 | 20-23 | 8-15 |
| 3 | 8-11 | 24-27 | 16-23 |
| 4 | 12-15 | 28-31 | 24-31 |

For example, Table 7 shows a case in which the sending occasion for 2-step random access and the sending occasion for 4-step random access correspond to different random access preambles.

TABLE 7

| SSB ID | Sending occasion ID for 2-step random access | 2-step random access preamble ID | Sending occasion ID for 4-step random access | 4-step random access preamble ID |
|---|---|---|---|---|
| 1 | 0-3 | 0-3 | 4-7 | 16-19 |
| 2 | 0-3 | 4-7 | 4-7 | 20-23 |

TABLE 7-continued

| SSB ID | Sending occasion ID for 2-step random access | 2-step random access preamble ID | Sending occasion ID for 4-step random access | 4-step random access preamble ID |
|---|---|---|---|---|
| 3 | 0-3 | 8-11 | 4-7 | 24-27 |
| 4 | 0-3 | 12-15 | 4-7 | 28-31 |

Correspondence 3

Random access preambles corresponding to some SSBs in the SSB set are 2-step random access preambles, and random access preambles corresponding to the other SSBs are 4-step random access preambles. A quantity of SSBs corresponding to the 2-step random access preamble and a quantity of SSBs corresponding to the 4-step random access preamble may be equal or unequal.

In a case of the correspondence 3, optionally, each SSB corresponds to at least one sending occasion, and any two SSBs correspond to a same sending occasion. In addition, different SSBs correspond to different random access preambles. The any two SSBs may correspond to equal quantities of random access preambles or unequal quantities of random access preambles.

For example, Table 8 shows a case in which different SSBs correspond to a same sending occasion and different random access preambles.

TABLE 8

| SSB ID | Sending occasion ID for 2-step random access | 2-step random access preamble ID |
|---|---|---|
| 1 | 0-7 | 0-7 |
| 2 | 0-7 | 8-15 |

| SSB ID | Sending occasion ID for 4-step random access | 4-step random access preamble ID |
|---|---|---|
| 3 | 0-7 | 16-23 |
| 4 | 0-7 | 24-31 |

In a case of the correspondence 3, optionally, each SSB corresponds to at least one sending occasion, any two SSBs correspond to different sending occasions, and the any two SSBs may correspond to equal quantities of sending occasions or unequal quantities of sending occasions. In addition, different SSBs correspond to different random access preambles. The any two SSBs may correspond to equal quantities of random access preambles or unequal quantities of random access preambles.

For example, Table 9 shows a case in which different SSBs correspond to different sending occasions and different random access preambles.

TABLE 9

| SSB ID | Sending occasion ID for 2-step random access | 2-step random access preamble ID |
|---|---|---|
| 1 | 0-7 | 0-7 |
| 2 | 8-15 | 8-15 |

| SSB ID | Sending occasion ID for 4-step random access | 4-step random access preamble ID |
|---|---|---|
| 3 | 16-23 | 16-23 |
| 4 | 24-31 | 24-31 |

In a case of the correspondence 3, optionally, each SSB corresponds to at least one sending occasion, any two SSBs correspond to different sending occasions, and the any two SSBs may correspond to equal quantities of sending occasions or unequal quantities of sending occasions. In addition, different SSBs correspond to a same random access preamble. In other words, a same random access preamble has different functions when corresponding to different SSBs.

For example, Table 10 shows a case in which different SSBs correspond to different sending occasions and a same random access preamble.

TABLE 10

| SSB ID | Sending occasion ID for 2-step random access | 2-step random access preamble ID |
|---|---|---|
| 1 | 0-7 | 0-7 |
| 2 | 8-15 | 0-7 |

| SSB ID | Sending occasion ID for 4-step random access | 4-step random access preamble ID |
|---|---|---|
| 3 | 16-23 | 0-7 |
| 4 | 24-31 | 0-7 |

In a case of the correspondence 3, optionally, each SSB corresponds to at least one sending occasion, any two SSBs corresponding to the 2-step random access preamble correspond to a same 2-step random access preamble, and the any two SSBs corresponding to the 2-step random access preamble correspond to different sending occasions. The any two SSBs corresponding to the 2-step random access preamble may correspond to equal quantities of sending occasions or unequal quantities of sending occasions. The 2-step random access preamble is different from the 4-step random access preamble.

Further, a correspondence between an SSB and each of a 4-step random access preamble and a sending occasion is not limited.

For example, any two SSBs corresponding to the 4-step random access preamble correspond to a same 4-step random access preamble, and the any two SSBs corresponding to the 4-step random access preamble correspond to different sending occasions. The any two SSBs corresponding to the 4-step random access preamble may correspond to equal quantities of sending occasions or unequal quantities of sending occasions.

It should be understood that a configuration manner of the 2-step RACH resource may be changed with a configuration manner of the 4-step RACH resource.

For example, Table 11 shows a case in which SSBs corresponding to a same type of random access preamble correspond to different sending occasions and a same random access preamble.

TABLE 11

| SSB ID | Sending occasion ID for 2-step random access | 2-step random access preamble ID |
|---|---|---|
| 1 | 0-7 | 0-7 |
| 2 | 8-15 | 0-7 |

| SSB ID | Sending occasion ID for 2-step random access | 4-step random access preamble ID |
|---|---|---|
| 3 | 16-23 | 8-15 |
| 4 | 24-31 | 8-15 |

In a case of the correspondence 3, optionally, each SSB corresponds to at least one sending occasion, any two SSBs corresponding to the 2-step random access preamble correspond to a same sending occasion, and the any two SSBs corresponding to the 2-step random access preamble correspond to different random access preambles. The any two SSBs corresponding to the 2-step random access preamble may correspond to equal quantities of random access preambles or unequal quantities of random access preambles. The sending occasion for 2-step random access is different from the sending occasion for 4-step random access.

Further, a correspondence between an SSB and each of a 4-step random access preamble and a sending occasion is not limited.

For example, any two SSBs corresponding to the 4-step random access preamble correspond to a same sending occasion for 4-step random access, and any two SSBs corresponding to the random access preamble for 4-step random access correspond to different random access preambles. The any two SSBs corresponding to the 4-step random access preamble may correspond to equal quantities of random access preambles or unequal quantities of random access preambles.

For example, Table 12 shows a case in which SSBs corresponding to a same type of random access preamble correspond to different random access preambles and a same sending occasion.

TABLE 12

| SSB ID | Sending occasion ID | 2-step random access preamble ID |
|---|---|---|
| 1 | 0-7 | 0-3 |
| 2 | 0-7 | 4-7 |

| SSB ID | Sending occasion ID | 4-step random access preamble ID |
|---|---|---|
| 3 | 16-23 | 8-11 |
| 4 | 16-23 | 12-14 |

It should be understood that Table 1 to Table 12 are merely example descriptions, and do not constitute any limitation on this application.

It can be learned that, for the correspondence 1 and the correspondence 2, random access preambles corresponding to each SSB include a 2-step random access preamble and a 4-step random access preamble. For the correspondence 3, each SSB corresponds to only one type of random access preamble in the 2-step random access preamble and the 4-step random access preamble.

In this application, in a case, the target random access preamble determined in S210 is selected from the 2-step random access preamble configured by the network device. A manner in which the terminal device determines the target random access preamble from the 2-step random access preamble configured by the network device is described below with reference to the foregoing correspondences between a RACH resource and a reference signal.

Manner A

The 2-step random access preamble configured by the network device corresponds to at least one first data amount threshold, and each first data amount threshold corresponds to one second signal strength threshold. A first data amount threshold corresponding to a 2-step random access preamble is a maximum data sending amount supported by the 2-step random access preamble.

That the terminal device determines a random access preamble includes:

if a reference signal whose corresponding RSRP is greater than a first signal strength threshold exists in at least one reference signal, selecting a target reference signal from the reference signal whose corresponding RSRP is greater than the first signal strength threshold; and if an amount of to-be-transmitted data is less than or equal to one of the at least one first data amount threshold, and an RSRP of the target reference signal is greater than a target second signal strength threshold, determining the target random access preamble from a 2-step random access preamble corresponding to the target reference signal, where the target second signal strength threshold is a second signal strength threshold that corresponds to a first data amount threshold corresponding to the amount of to-be-transmitted data.

In this application, the target random access preamble supports the amount of to-be-transmitted data. Further, a first data amount threshold corresponding to the target random access preamble is a first data amount threshold corresponding to the target second signal strength threshold.

It should be understood that an RSRP corresponding to a reference signal is an RSRP obtained by measuring the reference signal.

That the 2-step random access preamble configured by the network device corresponds to at least one first data amount threshold may be understood as follows: One first data amount threshold corresponds to one group of 2-step random access preambles, two groups of 2-step random access preambles corresponding to any two first data amount thresholds are different, and a maximum data sending amount supported by a 2-step random access preamble in a group of 2-step random access preambles is a first data amount threshold corresponding to the group of 2-step random access preambles.

It should be understood that there is a correspondence between a random access preamble and a PUSCH resource, and a PUSCH resource corresponds to a size of a maximum transmitted data block, namely, a maximum TBS. It may be considered that the random access preamble corresponds to a TBS, and this means that when an amount of to-be-sent data is less than (or equal to) a TBS, a random access preamble corresponding to the TBS may be used. Therefore, a data amount supported by a random access preamble is a TBS corresponding to a PUSCH resource corresponding to the random access preamble.

In this application, the at least one reference signal is the SSB set or the CSI-RS set configured by the network device. A first data amount threshold corresponding to the SSB set and a first data amount threshold corresponding to the CSI-RS set may be configured by the network device based on the configuration information. Alternatively, the first data amount threshold corresponding to the SSB set and the first data amount threshold corresponding to the CSI-RS set may be determined based on a modulation and coding scheme (MCS) of a PUSCH resource and a size of a PUSCH frequency domain resource that are configured by the network device based on the configuration information. It should be understood that the PUSCH resource is a resource used to send the to-be-transmitted data. A second signal strength threshold corresponding to the SSB set and a second signal strength threshold corresponding to the CSI-RS set may be configured by the network device based on the configuration information. However, this is not limited in this application. The second signal strength threshold corresponding to the SSB set and the second signal strength threshold corresponding to the CSI-RS set may be equal or unequal. Similarly, a first signal strength threshold corresponding to the SSB set and a first signal strength threshold corresponding to the CSI-RS set may be equal or unequal. The first signal strength threshold is less than the second signal strength threshold. The first signal strength threshold may be a condition for selecting a 4-step RACH random access preamble in a current technology or a condition for selecting an SSB in a current technology. For details, refer to the current technology. It should be understood that descriptions of any concept, word, or term herein is also applicable to any one of the following manners. Therefore, when another manner of determining the target random access preamble is described below, a same concept, word, or term is not described again.

In this application, the PUSCH resource may be configured based on PUSCH resource configuration information. The PUSCH resource configuration information may include at least one of a PUSCH time domain resource, a PUSCH frequency domain resource, a demodulation reference signal (DMRS), a quantity of times that sending may be repeatedly performed, an MCS, an initial PUSCH transmit power, a target PUSCH receive power, a PUSCH transmit power ramp step, and a power deviation relative to a random access preamble (namely, Δ1 in the following). The initial PUSCH transmit power may be a PUSCH transmit power that exists during initial transmission of a message A. The target PUSCH receive power is a PUSCH receive power expected by the network device, and the terminal device determines the PUSCH transmit power of the message A based on this value, a path loss, and the like. The PUSCH transmit power ramp step is a power ramp step that is of the terminal device and that exists during retransmission of the message A, for example, a power ramp step that is of a PUSCH part and that exists when the message A is retransmitted after the message A is sent and no response is received from the network device. The power deviation relative to the random access preamble is a difference (Δ1) between the transmit power of the PUSCH part of the message A and a transmit power of a random access preamble of the message A (namely, a TP in the following). Optionally, during the initial transmission of the message A, the transmit power of the PUSCH part of the message A is determined based on the deviation, the transmit power of the random access preamble part of the message A, and the like. The transmit power of the random access preamble part of the message A is determined based on the path loss and a target receive power that is of the random access preamble part of the message A and that is configured by the network device. For ease of understanding, in the following, the first signal strength threshold corresponding to the SSB set is recorded as a first SSB-RSRP threshold, the first signal strength threshold corresponding to the CSI-RS set is recorded as a first CSI-RS-RSRP threshold, the second signal strength threshold corresponding to the SSB set is recorded as a second SSB-RSRP threshold, and the second signal strength threshold corresponding to the CSI-RS set is recorded as a second CSI-RS-RSRP threshold. It may be understood that the second signal strength threshold may be a condition for selecting a 2-step RACH random access preamble or a condition for selecting an SSB in this application.

Manner A is described below by separately using examples in which there is one or two first data amount thresholds.

(1) There is one first data amount threshold.

For ease of understanding, when there is one first data amount threshold, the configured first data amount threshold is denoted as TBS #1 below. Specifically, the terminal device may first determine whether an SSB whose corresponding RSRP is greater than the first SSB-RSRP threshold exists in the configured SSB set. If an SSB whose corresponding RSRP is greater than the first SSB-RSRP threshold exists in the configured SSB set, an SSB may be randomly selected from the SSB whose corresponding RSRP is greater than the first SSB-RSRP threshold, and the selected SSB is used as a target SSB.

Then, the terminal device determines whether the amount of to-be-transmitted data is less than or equal to TBS #1. If the amount of to-be-transmitted data is greater than TBS #1, it indicates that 2-step random access cannot be performed. If the amount of to-be-transmitted data is less than or equal to TBS #1, the terminal device determines whether an RSRP of the target SSB is greater than the second SSB-RSRP threshold. If the RSRP of the target SSB is greater than the second SSB-RSRP threshold, it is determined whether a random access preamble corresponding to the target SSB includes a 2-step random access preamble that meets a condition. If the random access preamble corresponding to the target SSB includes a 2-step random access preamble that meets the condition, at least one random access preamble in the 2-step random access preamble that meets the condition in the 2-step random access preamble corresponding to the target SSB may be determined as the target random access preamble.

In Manner A to Manner D, the 2-step random access preamble that meets the condition is a 2-step random access preamble that supports the amount of to-be-transmitted data, or a 2-step random access preamble whose corresponding first data amount threshold is the first data amount threshold corresponding to the target second signal strength threshold.

It should be understood that, when there is one first data amount threshold, the first data amount threshold corresponding to the amount of to-be-transmitted data is TBS #1, the target second signal strength threshold is the second SSB-RSRP threshold, and the 2-step random access preamble that meets the condition is a 2-step random access preamble that supports a maximum data sending amount of TBS #1.

It should be further understood that, that a 2-step random access preamble supports the amount of to-be-transmitted data may be understood as follows: A first data amount threshold corresponding to the 2-step random access preamble is greater than or equal to the amount of to-be-transmitted data.

(2) There are two first data amount thresholds.

For ease of understanding, when there are two first data amount thresholds, the two first data amount thresholds are respectively denoted as TBS #1 and TBS #2 below. TBS #1<TBS #2. TBS #1 corresponds to a second SSB-RSRP threshold #1, and TBS #2 corresponds to a second SSB-RSRP threshold #2.

Specifically, similar to a case in which there is one first data amount threshold, the terminal device may first determine whether an SSB whose corresponding RSRP is greater than the first SSB-RSRP threshold exists in the configured SSB set. If an SSB whose corresponding RSRP is greater than the first SSB-RSRP threshold exists in the configured SSB set, an SSB may be randomly selected from the SSB whose corresponding RSRP is greater than the first SSB-RSRP threshold, and the selected SSB is used as a target SSB.

Then, the terminal device determines whether the amount of to-be-transmitted data is less than or equal to TBS #1, or whether the amount of to-be-transmitted data is less than or equal to TBS #2.

If the amount of to-be-transmitted data is greater than TBS #2, it indicates that 2-step random access cannot be performed.

If the amount of to-be-transmitted data is less than or equal to TBS #1, the terminal device determines whether an RSRP of the target SSB is greater than the second SSB-RSRP threshold #1. If the RSRP of the target SSB is greater than the second SSB-RSRP threshold #1, it is determined whether a random access preamble corresponding to the target SSB includes a 2-step random access preamble that meets a condition. If the random access preamble corresponding to the target SSB includes a 2-step random access preamble that meets the condition, at least one random access preamble that meets the condition in the 2-step random access preamble corresponding to the target SSB may be determined as the target random access preamble. For example, it is assumed that a group of 2-step random access preambles corresponding to TBS #1 is a preamble group #1, and a group of 2-step random access preambles corresponding to TBS #2 is a preamble group #2. The target random access preamble may be a random access preamble in the preamble group #1, or may be a random access preamble in the preamble group #2. Preferably, the target random access preamble is a random access preamble selected from the preamble group #1.

Alternatively, if the amount of to-be-transmitted data is less than or equal to TBS #2 and greater than TBS #1, the terminal device determines whether an RSRP of the target SSB is greater than the second SSB-RSRP threshold #2. If the RSRP of the target SSB is greater than the second SSB-RSRP threshold #2, it is determined whether a random access preamble corresponding to the target SSB includes a 2-step random access preamble that meets a condition. If the random access preamble corresponding to the target SSB includes a 2-step random access preamble that meets the condition, at least one random access preamble that meets the condition in the 2-step random access preamble corresponding to the target SSB may be determined as the target random access preamble. Herein, the target random access preamble can only be a random access preamble selected from the preamble group #2.

It should be understood that if a quantity of first data amount thresholds is a value greater than or equal to 2, it is assumed that the at least one first data amount threshold is sequentially TBS #1, TBS #2, TBS #3, . . . that are in ascending order, second signal strength thresholds sequentially corresponding to the at least one first data amount threshold are the second SSB-RSRP threshold #1, the second SSB-RSRP threshold #2, a second SSB-RSRP threshold #3, . . . , and a second signal strength threshold corresponding to any first data amount threshold TBS #i is a second SSB-RSRP threshold #i. If the amount of to-be-transmitted data is less than or equal to TBS #1, the first data amount threshold corresponding to the amount of to-be-transmitted data is TBS #1, and the target second signal strength threshold is the second SSB-RSRP threshold #1. If the amount of to-be-transmitted data is greater than TBS #i and less than or equal to TBS #(i+1), the first data amount threshold corresponding to the amount of to-be-transmitted data is TBS #(i+1), and the target second signal strength threshold is a second SSB-RSRP threshold #(i+1). For example, when there are two first data amount thresholds, if the amount of to-be-transmitted data is less than TBS #1, the first data amount threshold corresponding to the amount of to-be-transmitted data is TBS #1, and the target second signal strength threshold is the second SSB-RSRP threshold #1. If the amount of to-be-transmitted data is greater than TBS #1 and less than or equal to TBS #2, the first data amount threshold corresponding to the amount of to-be-transmitted data is TBS #2, and the target second signal strength threshold is the second SSB-RSRP threshold #2.

It should be understood that, that the reference signal is an SSB is only used as an example for description in this specification. When the reference signal is a CSI-RS, the target random access preamble may be determined in a similar manner. Details are not described herein again.

Manner B

The 2-step random access preamble configured by the network device corresponds to at least one first data amount threshold, and each first data amount threshold corresponds to one second signal strength threshold. A first data amount threshold corresponding to a 2-step random access preamble is a maximum data sending amount supported by the 2-step random access preamble.

That the terminal device determines a random access preamble includes:

if an amount of to-be-transmitted data is less than or equal to one of the at least one first data amount threshold, and a reference signal whose corresponding RSRP is greater than a target second signal strength threshold exists in at least one reference signal, selecting a target reference signal from the reference signal whose corresponding RSRP is greater than the second signal strength threshold, and determining the target random access preamble from a 2-step random access preamble corresponding to the target reference signal, where for a definition of the target second signal strength threshold, refer to Manner A.

Optionally, the target random access preamble supports the amount of to-be-transmitted data. Further, a first data amount threshold corresponding to the target random access preamble is a first data amount threshold corresponding to the target second signal strength threshold.

Manner B is also described herein by separately using examples in which there is one or two first data amount thresholds.

(1) There is one first data amount threshold.

Specifically, the terminal device may first determine whether the amount of to-be-transmitted data is less than or equal to TBS #1. If the amount of to-be-transmitted data is less than or equal to TBS #1, the terminal device determines whether an SSB whose corresponding RSRP is greater than a second SSB-RSRP threshold exists in the SSB set. If an SSB whose corresponding RSRP is greater than the second SSB-RSRP threshold exists in the SSB set, an SSB may be randomly selected, as a target SSB, from the SSB whose corresponding RSRP is greater than the second SSB-RSRP threshold. Then, the terminal device determines whether a random access preamble corresponding to the target SSB includes a 2-step random access preamble that meets a condition. If the random access preamble corresponding to the target SSB includes a 2-step random access preamble that meets the condition, at least one random access preamble that meets the condition in the 2-step random access preamble corresponding to the target SSB may be determined as the target random access preamble.

(2) There are two first data amount thresholds.

Specifically, the terminal device may first determine whether the amount of to-be-transmitted data is less than or equal to TBS #1, or whether the amount of to-be-transmitted data is less than or equal to TBS #2. If the amount of to-be-transmitted data is less than or equal to TBS #1, the terminal device determines whether an SSB whose corresponding RSRP is greater than a second SSB-RSRP threshold #1 exists in the SSB set. If an SSB whose corresponding RSRP is greater than the second SSB-RSRP threshold #1 exists in the SSB set, an SSB may be randomly selected, as a target SSB, from the SSB whose corresponding RSRP is greater than the second SSB-RSRP threshold #1. Then, the terminal device determines whether a random access preamble corresponding to the target SSB includes a 2-step random access preamble that meets a condition. If the random access preamble corresponding to the target SSB includes a 2-step random access preamble that meets the condition, at least one random access preamble that meets the condition in the 2-step random access preamble corresponding to the target SSB may be determined as the target random access preamble. Alternatively, if the amount of to-be-transmitted data is less than or equal to TBS #2 and greater than TBS #1, the terminal device determines whether an SSB whose corresponding RSRP is greater than a second SSB-RSRP threshold #2 exists in the SSB set. If an SSB whose corresponding RSRP is greater than the second SSB-RSRP threshold #2 exists in the SSB set, an SSB may be randomly selected, as a target SSB, from the SSB whose corresponding RSRP is greater than the second SSB-RSRP threshold #2. Then, the terminal device determines whether a random access preamble corresponding to the target SSB includes a 2-step random access preamble that meets a condition. If the random access preamble corresponding to the target SSB includes a 2-step random access preamble that meets the condition, at least one random access preamble that meets the condition in the 2-step random access preamble corresponding to the target SSB may be determined as the target random access preamble. A difference between Manner B and Manner A is as follows: In Manner B, the target SSB may be directly selected from the SSB whose corresponding RSRP is greater than the second SSB-RSRP threshold, but in Manner A, the target SSB needs to be first selected from the SSB whose corresponding RSRP is greater than the first SSB-RSRP threshold. Efficiency in Manner B is higher than that in Manner A.

For Manner A and Manner B, it may be learned, based on the foregoing described correspondences between a reference signal and a RACH resource, that if the target SSB exists, and the correspondence between a reference signal and a RACH resource is the correspondence 1 or the correspondence 2, it is very possible that the target random access preamble can be determined. If the target SSB exists, and the correspondence between a reference signal and a RACH resource is the correspondence 3, it is possible that the target random access preamble cannot be determined. For example, the correspondence between a reference signal and a RACH resource is shown in Table 8, and the selected target SSB is the SSB whose ID is 2. Because the SSB whose ID is 2 corresponds to only the 4-step random access preamble, the target random access preamble cannot be determined. In other words, there is no target random access preamble.

Manner C

The 2-step random access preamble configured by the network device corresponds to at least one first data amount threshold, and each first data amount threshold corresponds to one second signal strength threshold. A first data amount threshold corresponding to a 2-step random access preamble is a maximum data sending amount supported by the 2-step random access preamble.

That the terminal device determines a random access preamble includes:

if a reference signal whose corresponding RSRP is greater than a first signal strength threshold exists in at least one reference signal, an amount of to-be-transmitted data is less than or equal to one of the at least one first data amount threshold, and a reference signal whose corresponding RSRP is greater than a target second signal strength threshold exists in the reference signal whose corresponding RSRP is greater than the first signal strength threshold, determining a target reference signal from the reference signal whose corresponding RSRP is greater than the target second signal strength threshold, and determining, as the target random access preamble, at least one 2-step random access preamble that meets a condition in the target reference signal, where the target reference signal may be a reference signal whose corresponding random access preamble includes a 2-step random access preamble that meets the condition in the reference signal whose corresponding RSRP is greater than the target second signal strength threshold, and for a definition of the target second signal strength threshold, refer to Manner A.

Manner C is also described herein by separately using examples in which there is one or two first data amount thresholds.

(1) There is one first data amount threshold.

Specifically, the terminal device may first determine whether the configured SSB set includes a first set, whether the amount of to-be-transmitted data is less than or equal to TBS #1, and whether any SSB whose RSRP is greater than a first SSB-RSRP threshold exists in the first set. If the SSB set includes the first set, and the amount of to-be-transmitted data is less than or equal to TBS #1, the terminal device determines whether an SSB whose corresponding RSRP is greater than a second SSB-RSRP threshold exists in the first set. If an SSB whose corresponding RSRP is greater than the second SSB-RSRP threshold exists in the first set, it is further determined whether a random access preamble corresponding to each SSB whose corresponding RSRP is greater than the second SSB-RSRP threshold includes a 2-step random access preamble that meets the condition. If the random access preamble corresponding to each SSB whose corresponding RSRP is greater than the second SSB-RSRP threshold includes a 2-step random access preamble that meets the condition, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble.

(2) There are two first data amount thresholds.

Specifically, the terminal device may first determine whether the configured SSB set includes a first set, and if the configured SSB set includes the first set, the terminal device determines whether the amount of to-be-transmitted data is less than or equal to TBS #1, or whether the amount of to-be-transmitted data is less than or equal to TBS #2.

If the amount of to-be-transmitted data is less than or equal to TBS #1, the terminal device determines whether an SSB whose corresponding RSRP is greater than a second SSB-RSRP threshold #1 exists in an SSB whose corresponding RSRP is greater than a first SSB-RSRP threshold #1 in the SSB set. If an SSB whose corresponding RSRP is greater than the second SSB-RSRP threshold #1 exists in the SSB whose corresponding RSRP is greater than the first SSB-RSRP threshold #1 in the SSB set, it is further determined whether a random access preamble corresponding to each SSB whose corresponding RSRP is greater than the second SSB-RSRP threshold #1 includes a 2-step random access preamble that meets the condition. If the random access preamble corresponding to each SSB whose corresponding RSRP is greater than the second SSB-RSRP threshold #1 includes a 2-step random access preamble that meets the condition, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble.

Alternatively, if the amount of to-be-transmitted data is less than or equal to TBS #2 and greater than TBS #1, the terminal device determines whether an SSB whose corresponding RSRP is greater than a second SSB-RSRP threshold #2 exists in an SSB whose corresponding RSRP is greater than a first SSB-RSRP threshold #2 in the SSB set. If an SSB whose corresponding RSRP is greater than the second SSB-RSRP threshold #2 exists in the SSB whose corresponding RSRP is greater than the first SSB-RSRP threshold #2 in the SSB set, it is further determined whether a random access preamble corresponding to each SSB whose corresponding RSRP is greater than the second SSB-RSRP threshold #2 includes a 2-step random access preamble that meets the condition. If the random access preamble corresponding to each SSB whose corresponding RSRP is greater than the second SSB-RSRP threshold #2 includes a 2-step random access preamble that meets the condition, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble.

Manner D

The 2-step random access preamble configured by the network device corresponds to at least one first data amount threshold, and each first data amount threshold corresponds to one second signal strength threshold. A first data amount threshold corresponding to a 2-step random access preamble is a maximum data sending amount supported by the 2-step random access preamble.

That the terminal device determines a random access preamble includes:
if an amount of to-be-transmitted data is less than or equal to one of the at least one first data amount threshold, and a reference signal whose corresponding RSRP is greater than a target second signal strength threshold exists in at least one reference signal, determining a target reference signal in the reference signal whose corresponding RSRP is greater than the target second signal strength threshold, and determining, as the target random access preamble, at least one 2-step random access preamble that meets a condition in the target reference signal, where the target reference signal may be a reference signal whose corresponding random access preamble includes a 2-step random access preamble that meets the condition in the reference signal whose corresponding RSRP is greater than the target second signal strength threshold, and for a definition of the target second signal strength threshold, refer to Manner A.

Manner D is also described herein by separately using examples in which there is one or two first data amount thresholds.

(1) There is one first data amount threshold.

Specifically, the terminal device may first determine whether the amount of to-be-transmitted data is less than or equal to TBS #1. If the amount of to-be-transmitted data is less than or equal to TBS #1, the terminal device determines whether an SSB whose corresponding RSRP is greater than a second SSB-RSRP threshold exists in the SSB set. If an SSB whose corresponding RSRP is greater than the second SSB-RSRP threshold exists in the SSB set, it is further determined whether a random access preamble corresponding to each SSB whose corresponding RSRP is greater than the second SSB-RSRP threshold includes a 2-step random access preamble. If the random access preamble corresponding to each SSB whose corresponding RSRP is greater than the second SSB-RSRP threshold includes a 2-step random access preamble, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble.

(2) There are two first data amount thresholds.

Specifically, the terminal device may first determine whether the amount of to-be-transmitted data is less than or equal to TBS #1, or whether the amount of to-be-transmitted data is less than or equal to TBS #2. If the amount of to-be-transmitted data is less than or equal to TBS #1, the terminal device determines whether an SSB whose corresponding RSRP is greater than a second SSB-RSRP threshold #1 exists in the SSB set. If an SSB whose corresponding RSRP is greater than the second SSB-RSRP threshold #1 exists in the SSB set, it is further determined whether a random access preamble corresponding to each SSB whose corresponding RSRP is greater than the second SSB-RSRP threshold #1 includes a 2-step random access preamble that meets the condition. If the random access preamble corresponding to each SSB whose corresponding RSRP is greater than the second SSB-RSRP threshold #1 includes a 2-step random access preamble that meets the condition, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble. Alternatively, if the amount of to-be-transmitted data is less than or equal to TBS #2 and greater than TBS #1, the terminal device determines whether an SSB whose corresponding RSRP is greater than a second SSB-RSRP threshold #2 exists in the SSB set. If an SSB whose RSRP is greater than the second SSB-RSRP threshold #2 exists in the SSB set, it is further determined whether a random access preamble corresponding to each SSB whose corresponding RSRP is greater than the second SSB-RSRP threshold #2 includes a 2-step random access preamble that meets the condition. If the random access preamble corresponding to each SSB whose corresponding RSRP is greater than the second SSB-RSRP threshold #2 includes a 2-step random access preamble that meets the condition, an SSB whose corresponding random access preamble includes a 2-step random access preamble that meets the condition may be randomly selected as a target SSB, and at least one random access preamble that meets the condition in a 2-step random access preamble corresponding to the target SSB is determined as the target random access preamble.

A difference between Manner D and Manner C is as follows: In Manner D, the SSB whose corresponding RSRP is greater than the second SSB-RSRP threshold in the SSB set may be directly determined, but in Manner C, all SSBs whose corresponding RSRPs are greater than the first SSB-RSRP threshold need to be first determined from the SSB set, and then an SSB whose corresponding RSRP is greater than the second SSB-RSRP threshold is determined from all the SSBs whose corresponding RSRPs are greater than the first SSB-RSRP threshold. Efficiency in Manner D is higher than that in Manner C.

For Manner C and Manner D, it may be learned, based on the foregoing described correspondences between a reference signal and a RACH resource, that if the correspondence between a reference signal and a RACH resource is the correspondence 1 or the correspondence 2, and there is an SSB whose corresponding RSRP is greater than the second SSB-RSRP threshold, it is possible that the target random access preamble can be determined. If the correspondence between a reference signal and a RACH resource is the correspondence 3, and at least one SSB whose corresponding random access preamble includes a 2-step random access preamble exists in the SSB whose corresponding RSRP is greater than the second SSB-RSRP threshold, it is possible that the target random access preamble can be determined.

Manner E

The 2-step random access preamble configured by the network device corresponds to at least one first data amount threshold, each first data amount threshold corresponds to one value of PL1, and PL1 is a first path loss threshold. A first data amount threshold corresponding to a 2-step random access preamble is a maximum data sending amount supported by the 2-step random access preamble.

That the terminal device determines a random access preamble includes:
if there is at least one reference signal whose RSRP is greater than a first signal strength threshold, selecting a target reference signal from the reference signal whose RSRP is greater than the first signal strength threshold; and if an amount of to-be-transmitted data is less than or equal to one of the at least one first data amount threshold, and a path loss corresponding to the target reference signal is less than a target value of PL1, determining the target random access preamble from a 2-step random access preamble corresponding to the target reference signal. Optionally, the target random access preamble supports the amount of to-be-transmitted data. Further, a first data amount threshold corresponding to the target random access preamble is a first data amount threshold corresponding to a target second signal strength threshold.

In this application, PL1=PCMAX−TP−Δ1, PL1 is the first path loss threshold, PCMAX is a maximum transmit power of the terminal device in a cell in which the terminal device performs random access, TP is a target receive power of the 2-step random access preamble, and Δ1 is a power deviation between the to-be-sent data and the 2-step random access preamble. One or more of PCMAX, TP, and Δ1 may be configured based on the configuration information, or may be agreed by using a protocol. However, this is not limited in this application. The target value of PL1 is a value that is of PL1 and that corresponds to a first data amount threshold corresponding to the amount of to-be-transmitted data.

For example, the path loss may be a difference between an RSRP at which the network device sends the reference signal and an RSRP measured by the terminal device. The RSRP at which the network device sends the reference signal may be configured by the network device for the terminal device. Alternatively, the network device may directly configure the value of PL1, or the value of PL1 is specified by using a protocol.

Manner E is described below by separately using examples in which there is one or two first data amount thresholds.

(1) There is one first data amount threshold.

Specifically, the terminal device may first determine whether an SSB whose corresponding RSRP is greater than the first SSB-RSRP threshold exists in the configured SSB set. If an SSB whose corresponding RSRP is greater than the first SSB-RSRP threshold exists in the configured SSB set, an SSB may be randomly selected from the SSB whose corresponding RSRP is greater than the first SSB-RSRP threshold, and the selected SSB is used as a target SSB.

Then, the terminal device determines whether the amount of to-be-transmitted data is less than or equal to TBS #1. If the amount of to-be-transmitted data is greater than TBS #1, it indicates that 2-step random access cannot be performed. If the amount of to-be-transmitted data is less than or equal to TBS #1, the terminal device determines whether a path loss corresponding to the target SSB is less than the target value of PL1. If the path loss corresponding to the target SSB is less than the target value of PL1, it is determined whether a random access preamble corresponding to the target SSB includes a 2-step random access preamble that meets a condition, and if the random access preamble corresponding to the target SSB includes a 2-step random access preamble that meets the condition, at least one random access preamble that meets the condition in the 2-step random access preamble corresponding to the target SSB may be determined as the target random access preamble.

In Manner E to Manner F, the 2-step random access preamble that meets the condition is a 2-step random access preamble that supports the amount of to-be-transmitted data, or a 2-step random access preamble whose corresponding first data amount threshold is a first data amount threshold corresponding to the target value of PL1.

It should be understood that, when there is one first data amount threshold, the first data amount threshold corresponding to the amount of to-be-transmitted data is TBS #1, the target value of PL1 is the only one value of PL1, and the 2-step random access preamble that meets the condition is a 2-step random access preamble that supports a maximum data sending amount of TBS #1.

(2) There are two first data amount thresholds.

For ease of understanding, in the following, a value that is of PL1 and that corresponds to TBS #1 is denoted as PL1 #1, and a value that is of PL1 and that corresponds to TBS #2 is denoted as PL1 #2.

Specifically, the terminal device may first determine whether an SSB whose corresponding RSRP is greater than the first SSB-RSRP threshold exists in the configured SSB set. If an SSB whose corresponding RSRP is greater than the first SSB-RSRP threshold exists in the configured SSB set, an SSB may be randomly selected from the SSB whose corresponding RSRP is greater than the first SSB-RSRP threshold, and the selected SSB is used as a target SSB.

Then, the terminal device determines whether the amount of to-be-transmitted data is less than or equal to TBS #1, or whether the amount of to-be-transmitted data is less than or equal to TBS #2.

If the amount of to-be-transmitted data is greater than TBS #2, it indicates that 2-step random access cannot be performed.

If the amount of to-be-transmitted data is less than or equal to TBS #1, the terminal device determines whether a path loss corresponding to the target SSB is less than PL1 #1. If the path loss corresponding to the target SSB is less than PL1 #1, the terminal device determines whether a random access preamble corresponding to the target SSB includes a 2-step random access preamble that meets a condition, and if the random access preamble corresponding to the target SSB includes a 2-step random access preamble that meets the condition, at least one random access preamble that meets the condition in the 2-step random access preamble corresponding to the target SSB may be determined as the target random access preamble.

Alternatively, if the amount of to-be-transmitted data is less than or equal to TBS #2 and greater than TBS #1, the terminal device determines whether a path loss corresponding to the target SSB is less than PL1 #2. If the path loss corresponding to the target SSB is less than PL1 #2, it is determined whether a random access preamble corresponding to the target SSB includes a 2-step random access preamble that meets a condition, and if the random access preamble corresponding to the target SSB includes a 2-step random access preamble that meets the condition, at least one random access preamble that meets the condition in the 2-step random access preamble corresponding to the target SSB may be determined as the target random access preamble.

It should be understood that, if a quantity of the first data amount threshold is a value greater than or equal to 2, it is assumed that the at least one first data amount threshold is sequentially TBS #1, TBS #2, TBS #3, . . . that are in ascending order, values of PL1 that sequentially correspond to the at least one first data amount threshold are PL1 #1, PL1 #2, PL1 #3, . . . , and a value that is PL1 and that corresponds to any first data amount threshold TBS #i is PL1 #i. If the amount of to-be-transmitted data is greater than 0 and less than or equal to TBS #1, the first data amount threshold corresponding to the amount of to-be-transmitted data is TBS #1, and the target value of PL1 is PL1 #1. If the amount of to-be-transmitted data is greater than TBS #i and less than or equal to TBS #(i+1), the first data amount threshold corresponding to the amount of to-be-transmitted data is TBS #(i+1), and the target value of PL1 is PL1 #(i+1). For example, when there are two first data amount thresholds, if the amount of to-be-transmitted data is less than TBS #1, the first data amount threshold corresponding to the amount of to-be-transmitted data is TBS #1, and the target value of PL1 is PL1 #1. If the amount of to-be-transmitted data is greater than TBS #1 and less than or equal to TBS #2, the first data amount threshold corresponding to the amount of to-be-transmitted data is TBS #2, and the target value of PL1 is PL1 #2.

Manner F

The 2-step random access preamble configured by the network device corresponds to at least one first data amount threshold, each first data amount threshold corresponds to one value of PL1, and PL1 is a first path loss threshold. A first data amount threshold corresponding to a 2-step random access preamble is a maximum data sending amount supported by the 2-step random access preamble.

That the terminal device determines a random access preamble includes:
  if there is at least one reference signal whose RSRP is greater than a first signal strength threshold, an amount of to-be-transmitted data is less than or equal to one of the at least one first data amount threshold, and a reference signal whose corresponding path loss is less than a target value of PL1 exists in the reference signal whose corresponding RSRP is greater than the first signal strength threshold, determining a target reference signal from the reference signal whose corresponding RSRP is greater than the first signal strength threshold and corresponding path loss is less than the target value of PL1, and determining, as the target random access preamble, at least one 2-step random access preamble that meets a condition in the target reference signal, where the target reference signal may be a reference signal whose corresponding random access preamble includes a 2-step random access preamble that meets the condition in the reference signal whose corresponding RSRP is greater than the first signal strength threshold and corresponding path loss is less than the target value of PL1, and for a definition of the target value of PL1, refer to Manner E.

It may be understood that Manner F is similar to Manner C, and details are not described herein again.

Manner G

That a terminal determines a random access preamble includes:
  if a reference signal whose corresponding RSRP is greater than a first signal strength threshold exists in at least one reference signal, selecting a target reference signal from the reference signal whose corresponding RSRP is greater than the first signal strength threshold, and determining whether a first group of random access preambles are configured; and
  if the first group of random access preambles are configured, an amount of to-be-transmitted data is greater than a second data amount threshold, and a path loss corresponding to the target reference signal is less than a value of PL2, determining the target random access preamble from a random access preamble that is in the first group of random access preambles and that corresponds to the target reference signal;
  if the first group of random access preambles are configured, and an amount of to-be-transmitted data is less than or equal to a second data amount threshold, determining the target random access preamble from a random access preamble that is in a second group of random access preambles and that corresponds to the target reference signal; or
  if the first group of random access preambles are configured, and a path loss corresponding to the target reference signal is greater than or equal to a value of PL2, determining the target random access preamble from a random access preamble that is in a second group of random access preambles and that corresponds to the target reference signal.

A data sending amount supported by the first group of random access preambles is greater than the second data amount threshold, and a maximum data sending amount supported by the second group of random access preambles is the second data amount threshold. The first group of random access preambles and the second group of random access preambles are 2-step random access preambles. PL2=PCMAX−TP−Δ1−Δ2, PL2 is a second path loss threshold, PCMAX is a maximum transmit power of the terminal device in a cell in which the terminal device performs random access, TP is a target receive power of a random access preamble for 2-step random access, Δ1 is a power deviation between the to-be-sent data and the 2-step random access preamble, and Δ2 is a power deviation between the first group of random access preambles and the second group of random access preambles. The first group of random access preambles, the second group of random access preambles, PCMAX, TP, Δ1, and Δ2 may be configured based on the configuration information. However, this is not limited in this application. The first group of random access preambles and the second group of random access preambles are 2-step random access preambles.

In this application, the at least one reference signal is the SSB set or the CSI-RS set configured by the network device. A second data amount threshold corresponding to the SSB set and a second data amount threshold corresponding to the CSI-RS set may be configured by the network device based on the configuration information. Alternatively, a second data amount threshold corresponding to the SSB set and a second data amount threshold corresponding to the CSI-RS set may be determined based on an MCS of a PUSCH resource and a size of a PUSCH frequency domain resource that are configured by the network device based on the configuration information. It should be understood that descriptions of any concept, word, or term herein is also applicable to any one of the following manners. Therefore, when another manner of determining the target random access preamble is described below, a same concept, word, or term is not described again.

The SSB is used as an example. In brief, if an SSB whose corresponding RSRP is greater than the first signal strength threshold exists in the SSB set configured by the network device, an SSB may be randomly selected, as a target SSB, from the SSB whose corresponding RSRP is greater than the first signal strength threshold. Then, the terminal device determines whether the first group of random access preambles are configured. If the first group of random access preambles are configured, and conditions (a) and (b) are met, the target random access preamble is determined from the random access preamble that is in the first group of random access preambles and that corresponds to the target reference signal. If either one of the conditions (a) and (b) is not met, the target random access preamble is determined from the random access preamble that is in the second group of random access preambles and that corresponds to the target reference signal. The condition (a) is that the amount of to-be-transmitted data is greater than the second data amount threshold. The condition (b) is that a path loss corresponding to the target reference signal is less than the value of PL2.

Manner H

That a terminal determines a random access preamble includes:
if a reference signal whose corresponding RSRP is greater than a first signal strength threshold exists in at least one reference signal, determining whether a first group of random access preambles are configured; and if the first group of random access preambles are configured, and conditions (c) and (d) are met, determining the target random access preamble from a random access preamble that is in the first group of random access preambles and that corresponds to a target reference signal. If either one of the conditions (c) and (d) is not met, the target random access preamble is determined from a random access preamble that is in a second group of random access preambles and that corresponds to the target reference signal. The condition (c) is that an amount of to-be-transmitted data is greater than a second data amount threshold. The condition (d) is that a reference signal whose corresponding path loss is less than a value of PL2 exists in a reference signal whose corresponding RSRP is greater than the first signal strength threshold.

Manner I

That a terminal determines a random access preamble includes:
if a reference signal whose corresponding RSRP is greater than a first signal strength threshold exists in at least one reference signal, selecting a target reference signal from the reference signal whose corresponding RSRP is greater than the first signal strength threshold, and determining whether a first group of random access preambles are configured; and
if the first group of random access preambles are configured, an amount of to-be-transmitted data is greater than a second data amount threshold, and the to-be-transmitted data is carried on a common control channel (CCCH), determining the target random access preamble from a random access preamble that is in the first group of random access preambles and that corresponds to the target reference signal; or
if the first group of random access preambles are configured, and an amount of to-be-transmitted data is less than or equal to a second data amount threshold, determining the target random access preamble from a random access preamble that is in a second group of random access preambles and that corresponds to the target reference signal; or
if the first group of random access preambles are configured, and to-be-transmitted data is not carried on a CCCH, determining the target random access preamble from a random access preamble that is in a second group of random access preambles and that corresponds to the target reference signal.

In Manner H and Manner I, further, if the terminal device determines that the first group of random access preambles are not configured, the terminal device determines the target random access preamble from the random access preamble that is in the second group of random access preambles and that corresponds to the target reference signal.

Optionally, in an embodiment of this application, if a random access preamble corresponding to the target reference signal does not include a 2-step random access preamble or does not include a 2-step random access preamble that meets a condition, the terminal device may determine the target random access preamble from the 4-step random access preamble configured by the network device. For example, the terminal device may determine, as the target random access preamble, a 4-step random access preamble that supports the amount of to-be-transmitted data in the random access preamble corresponding to the target reference signal. For another example, for a manner of selecting a 4-step random access preamble, refer to an existing manner. For example, selection is performed based on a measured path loss and an amount of to-be-sent data or based on a data amount triggered by the CCCH.

The foregoing describes how to determine the target random access preamble when the target random access preamble is a 2-step random access preamble. When the target random access preamble is a 4-step random access preamble, for a manner of determining the target random access preamble, refer to the current technology. Details are not described herein again.

Optionally, before the terminal device determines the target random access preamble, the terminal device may determine that 2-step random access needs to be performed to perform random access.

For example, the terminal device may determine, based on one or a combination of the following factors, that 2-step random access needs to be performed to perform random access:

(1) load information of 2-step random access and load information of 4-step random access, where for example, if load of 2-step random access is lower, it is determined that 2-step random access needs to be performed to perform random access;

(2) reason for initiating an uplink service by the terminal device, where for example, if the uplink service has a higher priority, it is determined that 2-step random access needs to be performed, and for example, in a case of an emergency call, it is determined that 2-step random access needs to be performed; and (3) quality of service information of an uplink service, where for example, for an inactive terminal device, for an uplink service with a high quality of service level, it is determined that 2-step random access needs to be performed.

Optionally, in an embodiment of this application, the terminal device may determine a random access type after determining the target SSB in the foregoing manners. For example, if the target SSB includes both a 2-step random access preamble and a 4-step random access preamble, the terminal device may determine, based on one or more of the foregoing factors (1) to (3), whether 2-step random access or 4-step random access is performed.

Optionally, in an embodiment of this application, that the terminal device performs random access by using the target random access preamble includes:

the terminal device determines a next available sending occasion from a sending occasion corresponding to the target reference signal; and performing random access on the available sending occasion by using the random access preamble.

The target reference signal may be determined by using some of the foregoing described manners of determining the random access preamble. The target reference signal corresponds to at least one sending occasion (or referred to as an available sending occasion). The terminal device may select a next sending occasion, to be specific, a sending occasion closest to a current time, and send the selected target random access preamble and the to-be-transmitted data on the sending occasion, to perform 2-step random access.

The following describes a possible application scenario of the method 400.

In an implementation, the method 400 may be used for initial data transmission. To be specific, random access performed in S420 is used for initial data transmission. It should be understood that random access performed in S420 may be 2-step random access or may be 4-step random access.

Optionally, when the method 400 is used for initial data transmission, the method may further include: performing 2-step random access when the random access fails.

To be specific, when the random access used for initial data transmission fails, the terminal device performs 2-step random access again.

When the terminal device performs 2-step random access again, the terminal device may reselect a random access preamble by using the foregoing manner of determining the target random access preamble, to perform random access. Alternatively, the terminal device may directly use the target random access preamble used during initial transmission, a random access preamble group that includes the target random access preamble (for example, the first group of random access preambles or the second group of random access preambles), or any random access preamble in the 2-step random access preamble that meets the condition in the target SSB, to perform random access.

Optionally, when the method 400 is used for initial data transmission, if the random access fails, and the terminal device does not receive a RACH resource for a fallback that is to 4-step random access and that is indicated by the network device, the terminal device performs 2-step random access again.

Optionally, when the method 400 is used for initial data transmission, the method may further include: when the random access fails, performing 4-step random access or falling back to 4-step random access.

When performing 4-step random access or falling back to 4-step random access, the terminal device may first determine the random access preamble used for 4-step random access.

Optionally, the terminal device may determine, in a manner of selecting a random access preamble during initial transmission of a message 3 or initial transmission of a PUSCH in the current technology, the random access preamble used for 4-step random access, or may determine, in a manner of selecting a random access preamble during retransmission of a message 3 or a PUSCH in the current technology, the random access preamble used for 4-step random access. For details, refer to the current technology. The details are not described herein again.

Optionally, when 4-step random access is used for initial transmission, the terminal device may also directly use the target random access preamble used during initial transmission, or any random access preamble in a random access preamble group that includes the target random access preamble used during initial transmission (for example, a group A or a group B in the current technology), to perform random access.

In this application, the network device may indicate the terminal device to fall back to 4-step random access, to send the random access preamble. Alternatively, when the terminal device does not receive a response message from the network device, the terminal device falls back to 4-step random access, to send the random access preamble; or the terminal device falls back to 4-step random access based on load of the network device, to send the random access preamble. For example, the network device sends load status information of 2-step or 4-step random access, and if load of 2-step random access is higher, the terminal device automatically falls back to 4-step random access. On the contrary, if load of 4-step random access is high, the terminal device automatically falls back to 2-step random access.

In this application, optionally, there may be one cause or a combination of a plurality of causes in the following causes for a random access failure:

The terminal device does not receive a message B or a message 2.

After the network device indicates a retransmission resource of a data part, the data part is still not successfully sent after N times of retransmission.

After the network device indicates to fall back to 4-step random access, the message 3 is still not successfully sent after N times of retransmission.

After the network device indicates to fall back to 4-step random access, a data part of the message A is still not sent successfully after N times of retransmission.

A response message received by the terminal device includes a preamble ID sent by the terminal device and an uplink grant allocated for the preamble ID, in other words, does not include contention resolution information corresponding to this preamble.

When the terminal device receives the response message, the response message includes the preamble ID sent by the terminal device and includes contention resolution information, but the terminal device does not successfully perform contention resolution.

When the network device indicates to retransmit the message A, a preamble and a PUSCH are carried during retransmission, and the message A is still not successfully sent after retransmission.

In another implementation, the method 400 may be used for data retransmission. To be specific, random access performed in S420 is used for data retransmission.

Further, when the method 400 is used for data retransmission, the method may further include: performing 2-step random access when 4-step random access fails.

To be specific, when 4-step random access used for initial data transmission fails, the terminal device chooses to perform 2-step random access again.

In still another implementation, when random access performed in S420 fails, the method may further include: The terminal device receives indication information sent by the network device, and performs random access based on the indication information. In other words, when random access fails, the terminal device performs random access again based on the indication information sent by the network device.

Specifically, when the random access performed in S420 fails, the network device may send the indication information to the terminal device. The indication information may indicate the terminal device to perform 2-step random access, or may indicate the terminal device to perform 4-step random access. After the terminal device receives the indication information sent by the network device, if the indication information indicates the terminal device to perform 2-step random access, the terminal device performs 2-step random access; or if the indication information indicates the terminal device to perform 4-step random access, the terminal device performs 4-step random access.

In comparison with the foregoing two manners in which after random access fails, the terminal device determines the random access type for performing random access again, in this implementation, the network device needs to indicate the random access type for performing random access again after random access fails.

The foregoing describes the method provided in this application, and the following describes an apparatus provided in this application.

Figure 5:
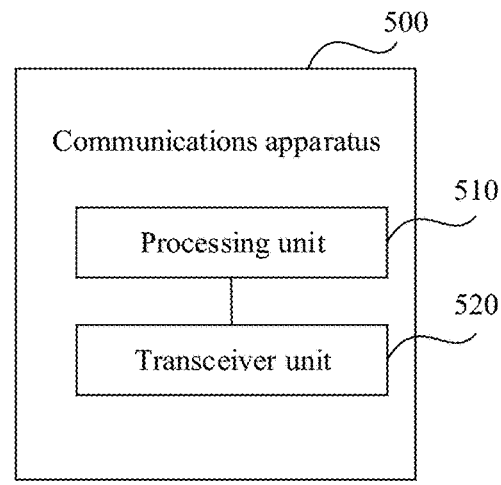
FIG. 5 is a schematic structural diagram of a communications apparatus according to this application.

FIG. 5 is a schematic block diagram of a communications apparatus according to an embodiment of this application. As shown in FIG. 5, a communications apparatus 500 may include a processing unit 510 and a transceiver unit 520.

In a possible design, the communications apparatus 500 may correspond to the terminal device in the foregoing method embodiment, for example, may be a terminal device or a chip configured in the terminal device. When the communications apparatus is a terminal device, the processing unit may be a processor, and the transceiver unit may be a transceiver. The communications apparatus may further include a storage unit, and the storage unit may be a memory. The storage unit is configured to store instructions, and the processing unit executes the instructions stored in the storage unit, so that the communications apparatus performs the foregoing method. When the communications apparatus is a chip in the terminal device, the processing unit may be a processor, and the transceiver unit may be an input/output interface, a pin, a circuit, or the like. The processing unit executes instructions stored in a storage unit, so that the communications apparatus performs operations performed by the terminal device in the method 400. The storage unit may be a storage unit (for example, a register or a cache) in the chip, or may be a storage unit that is in the communications apparatus and that is located outside the chip (for example, a read-only memory or a random access memory).

In an implementation, the communications apparatus 500 may correspond to the terminal device in the method according to the embodiments of this application, and the communications apparatus 500 may include a unit that is configured to perform the method performed by the terminal device in the method in FIG. 4. In addition, each unit in the communications apparatus and the foregoing other operations and/or functions are used to implement corresponding procedures of the method in FIG. 4. Specifically, the processing unit 510 may be configured to perform S410 in the method shown in FIG. 4, and the transceiver unit 520 may be configured to perform S420 and S404 in the method shown in FIG. 4.

In another possible design, the communications apparatus 500 may correspond to the network device in the foregoing method embodiment, for example, may be a network device or a chip configured in the network device. When the communications apparatus is a network device, the processing unit may be a processor, and the transceiver unit may be a transceiver. The communications apparatus may further include a storage unit, and the storage unit may be a memory. The storage unit is configured to store instructions, and the processing unit executes the instructions stored in the storage unit, so that the communications apparatus performs the foregoing method. When the communications apparatus is a chip in the network device, the processing unit may be a processor, and the transceiver unit may be an input/output interface, a pin, a circuit, or the like. The processing unit executes instructions stored in a storage unit, so that the communications apparatus performs operations performed by the network device in the method 400. The storage unit may be a storage unit (for example, a register or a cache) in the chip, or may be a storage unit that is in the communications apparatus and that is located outside the chip (for example, a read-only memory or a random access memory).

In an implementation, the communications apparatus 500 may correspond to the network device in the method according to the embodiments of this application, and the communications apparatus 500 may include a unit that is configured to perform the method performed by the network device in FIG. 4. In addition, each unit in the communications apparatus 500 and the foregoing other operations and/or functions are used to implement corresponding procedures of the method 400 in FIG. 4. Specifically, when the communications apparatus 500 is configured to perform the method 400 in FIG. 4, the processing unit 510 may be configured to perform S402 in the method shown in FIG. 4, and the transceiver unit 420 may be configured to perform S420 and S404 in the method shown in FIG. 4.

The network device and the terminal device in the foregoing apparatus embodiments completely correspond to the terminal device or the network device in the method embodiment, and a corresponding module or unit performs a corresponding step. For example, a transceiver unit (transceiver) method performs sending and/or receiving steps in the method embodiment. A step other than the sending and/or receiving steps may be performed by the processing unit (processor). For a function of a specific unit, refer to the corresponding method embodiment. The transceiver unit may include a sending unit and/or a receiving unit, and the transceiver may include a transmitter and/or a receiver, to separately implement a receiving function and a sending function. There may be one or more processors.

It should be understood that division into the foregoing units is merely function division, and there may be other division in an actual implementation.

The terminal device or the network device may be a chip, and the processing unit may be implemented by using hardware, or may be implemented by using software. When the processing unit is implemented by using hardware, the processing unit may be a logic circuit, an integrated circuit, or the like. When the processing unit is implemented by using software, the processing unit may be a general purpose processor, and is implemented by reading software code stored in the storage unit. The storage unit may be integrated in the processor, or may be located outside the processor and exist independently.

Figure 6:
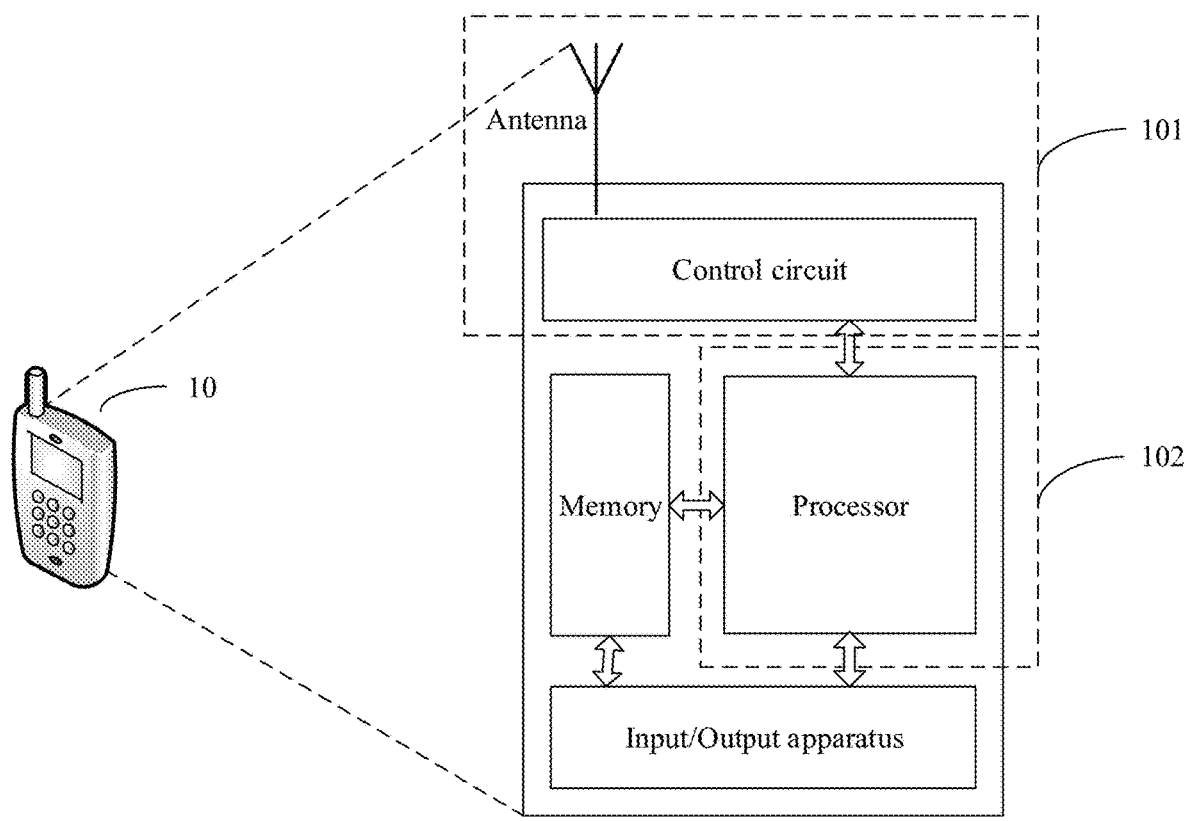
FIG. 6 is a schematic structural diagram of a terminal device according to this application.

FIG. 6 is a schematic structural diagram of a terminal device 10 according to this application. For ease of description, FIG. 6 shows only main components of the terminal device. As shown in FIG. 6, the terminal device 10 includes a processor, a memory, a control circuit, an antenna, and an input/output apparatus.

The processor is mainly configured to: process a communications protocol and communication data, control the entire terminal device, execute a software program, and process data of the software program. For example, the processor is configured to support the terminal device in performing actions described in the foregoing method embodiment. The memory is mainly configured to store a software program and data. The control circuit is mainly configured to: convert a baseband signal and a radio frequency signal, and process the radio frequency signal. The control circuit and the antenna together may also be referred to as a transceiver, and the transceiver is mainly configured to receive and send a radio frequency signal in an electromagnetic wave form. The input/output apparatus such as a touchscreen, a display, or a keyboard is mainly configured to: receive data entered by a user, and output data to the user.

After the terminal device is powered on, the processor may read a software program in a storage unit, explain and execute instructions of the software program, and process the data of the software program. When the processor needs to send data in a wireless manner, the processor outputs a baseband signal to a radio frequency circuit after performing baseband processing on the to-be-sent data. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 6 shows only one memory and only one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data, and the central processing unit is mainly configured to: control the entire terminal device, execute a software program, and process data of the software program. The processor in FIG. 6 integrates a function of the baseband processor and a function of the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built into the processor, or may be stored in the storage unit in a form of the software program, and the processor executes the software program to implement a baseband processing function.

For example, in this embodiment of this application, an antenna having a transceiver function and a control circuit may be considered as a transceiver unit 101 of the terminal device 10, and a processor having a processing function may be considered as a processing unit 102 of the terminal device 10. As shown in FIG. 6, the terminal device 10 includes a transceiver unit 101 and a processing unit 102. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver machine, a receiver, or a receiver circuit; and the sending unit may be referred to as a transmitter machine, a transmitter, or a transmit circuit.

The terminal device shown in FIG. 6 may perform actions performed by the terminal device in the foregoing method. To avoid repetition, detailed descriptions thereof are omitted herein.

Figure 7:
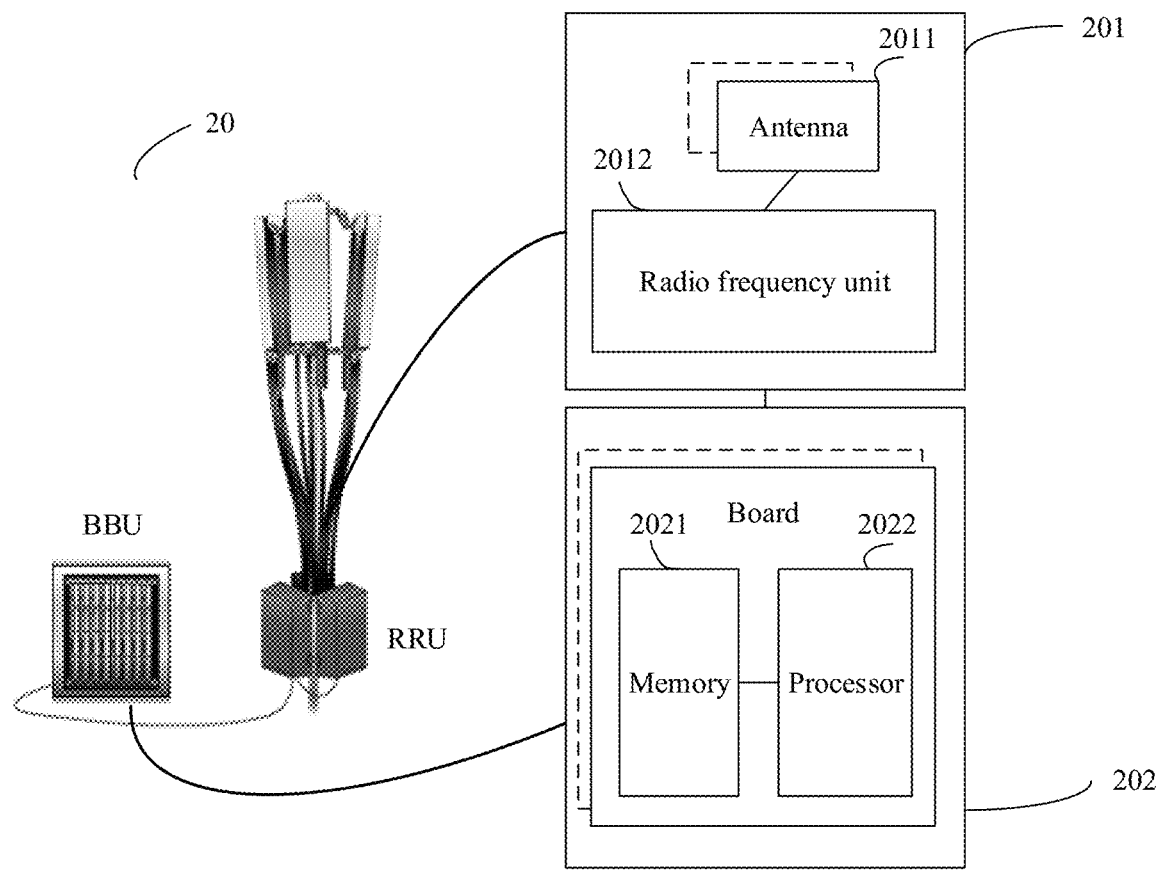
FIG. 7 is a schematic structural diagram of a network device according to this application.

FIG. 7 is a schematic structural diagram of a network device according to this application. The network device may be, for example, a base station. As shown in FIG. 7, the base station may be applied to the communications system shown in FIG. 1, to perform a function of the network device in the foregoing method embodiment. A base station 20 may include one or more radio frequency units such as a remote radio unit (RRU) 201 and one or more baseband units (BBU) (also referred to as a digital unit (DU)) 202. The RRU 201 may be referred to as a transceiver unit, a transceiver machine, a transceiver circuit, a transceiver, or the like, and may include at least one antenna 2011 and a radio frequency unit 2012. The RRU 201 part is mainly configured to: receive and send a radio frequency signal, and convert a radio frequency signal and a baseband signal, for example, is configured to send a BFR configuration in the foregoing method embodiment. The BBU 202 part is mainly configured to perform baseband processing, control the base station, or the like. The RRU 201 and the BBU 202 may be physically disposed together, or may be physically disposed separately. In other words, the base station is a distributed base station.

The BBU 202 is a control center of the base station, may also be referred to as a processing unit, and is mainly configured to complete a baseband processing function such as channel coding, multiplexing, modulation, or spectrum spreading. For example, the BBU (processing unit) 202 may be configured to control the base station to perform an operation procedure related to the network device in the foregoing method embodiment.

In an embodiment, the BBU 202 may include one or more boards, and a plurality of boards may jointly support a radio access network (for example, an LTE network) with a single access standard, or may separately support radio access networks (for example, an LTE network, a 5G network, or another network) with different access standards. The BBU 202 further includes a memory 2021 and a processor 2022, and the memory 2021 is configured to store necessary instructions and data. The processor 2022 is configured to control the base station to perform a necessary action, for example, is configured to control the base station to perform an operation procedure related to the network device in the foregoing method embodiment. The memory 2021 and the processor 2022 may serve one or more boards. In other words, a memory and a processor may be separately disposed on each board. Alternatively, a same memory and a same processor are shared by a plurality of boards. In addition, a necessary circuit may be disposed on each board.

In addition, the network device is not limited to the foregoing form, or may be in another form. For example, the network device includes a combination of the BBU and an adaptive radio unit (ARU), or a combination of the BBU and an active antenna unit (AAU). Alternatively, the network device may be customer premises equipment (CPE), or may be in another form. This is not limited in this application.

It should be noted that the processor in the embodiments of this application may be an integrated circuit chip and has a signal processing capability. In an implementation process, steps in the foregoing method embodiment can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the method, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It should be understood that, the processor in the embodiments of this application may be a central processing unit (CPU), or may be another general purpose processor, a digital signal processor (DSP), an application-specific integrated circuit (ASIC), a field programmable gate array (FPGA), or another programmable logic device, a discrete gate or transistor logic device, a discrete hardware component, or the like.

It should be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of random access memories (RAMs), such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM), may be used.

According to the method provided in the embodiments of this application, this application further provides a computer program product. The computer program product includes computer program code. When the computer program code is run on a computer, the computer is enabled to perform the method performed by the terminal device or the network device in the foregoing method embodiment.

According to the method provided in the embodiments of this application, this application further provides a computer-readable medium. The computer-readable medium stores program code. When the program code is run on a computer, the computer is enabled to perform the method performed by the terminal device or the network device in the foregoing method embodiment.

According to the method provided in the embodiments of this application, this application further provides a system. The system includes the foregoing one or more terminal devices and one or more network devices.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further understood that in this application, "when", "if", and "if" each mean that a terminal device or a network device performs corresponding processing in an objective case, and are not used to limit a time. In addition, the terminal device or the network device does not need to perform a determining action in an implementation, and it does not mean that there is another limitation.

The term "and/or" in this specification describes only an association relationship between associated objects and represents that three relationships may exist. For example, A and/or B may represent the following three cases: Only A exists, both A and B exist, and only B exists.

The term "at least one of . . . ", "at least one type of . . . ", or "at least one item of . . . " in this specification represents all or any combination of listed items. For example, "at least one type of A, B, and C" may represent the following six cases: A exists alone, B exists alone, C exists alone, both A and B exist, both B and C exist, and A, B and C all exist.

It should be understood that in the embodiments of this application, "B corresponding to A" indicates that B is associated with A, and B may be determined based on A. However, it should further be understood that determining A based on B does not mean that B is determined based on A only, and instead, B may alternatively be determined based on A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A random access method applied to a terminal device, the method comprising:
    determining a random access preamble from at least one 2-step random access preamble;
    performing 2-step random access by using the random access preamble;
    performing 4-step random access in response to a failure of the 2-step random access, by using any random access preamble in one or more groups of random access preamble groups comprising the random access preamble used in the 2-step random access; and wherein the determining the random access preamble from the at least one 2-step random access preamble comprises:
in response to a reference signal whose corresponding reference signal received power (RSRP) is greater than a first signal strength threshold existing in at least one reference signal configured by a network device, selecting a target reference signal from the reference signal whose corresponding RSRP is greater than the first signal strength threshold, wherein the reference signal is a synchronization signal block;
determining whether a first group of random access preambles are configured, wherein a data sending amount supported by the first group of random access preambles is greater than a data amount threshold; and
in response to the first group of random access preambles being configured, an amount of to-be-transmitted data being greater than the data amount threshold, and the to-be-transmitted data being carried on a common control channel, determining the random access preamble from at least one random access preamble that is in the first group of random access preambles and that corresponds to the target reference signal;
in response to the first group of random access preambles being configured, and an amount of to-be-transmitted data being less than or equal to the data amount threshold, determining the random access preamble from at least one random access preamble that is in a second group of random access preambles and that corresponds to the target reference signal.

2. The method according to claim 1, wherein the determining the random access preamble from the at least one 2-step random access preamble comprises:
in response to at least one reference signal whose corresponding reference signal received power (RSRP) is greater than the first signal strength threshold existing in at least one reference signal configured by a network device, selecting a target reference signal from the at least one reference signal whose corresponding RSRP is greater than the first signal strength threshold, wherein the at least one reference signal is a synchronization signal block;
determining whether a first group of random access preambles are configured, wherein a data sending amount supported by the first group of random access preambles is greater than a data amount threshold; and
in response to the first group of random access preambles being configured, an amount of to-be-transmitted data being greater than the data amount threshold, and a path loss corresponding to the target reference signal being less than a value of PL2, determining the random access preamble from at least one random access preamble that is in the first group of random access preambles and that corresponds to the target reference signal;
wherein PL2=PCMAX−TP−Δ1−Δ2, PL2 is a second path loss threshold, PCMAX is a maximum transmit power of the terminal device in a cell in which the terminal device performs random access, TP is a target receive power of a random access preamble for the 2-step random access, Δ1 is a power deviation between the to-be-sent data and the random access preamble used in the 2-step random access, and Δ2 is a power deviation between the first group of random access preambles and a second group of random access preambles.

3. The method according to claim 2, further comprising:
in response to the first group of random access preambles being not configured, determining the random access preamble from the at least one random access preamble that is in the second group of random access preambles and that corresponds to the target reference signal.

4. The method according to claim 1, wherein the random access preamble used in the 2-step random access is one of the at least one 2-step random access preamble, and the at least one 2-step random access preamble corresponds to at least one group of random access preambles.

5. The method according to claim 1, wherein the 2-step random access and the 4-step random access are used for initial data transmission.

6. The method according to claim 1, further comprising:
receiving from the network device, configuration information which configures a random access resource corresponding to a synchronization signal block, wherein the random access resource is used for performing the 2-step random access or the 4-step random access.

7. An apparatus comprising: a processor and a memory storing instructions; wherein the instructions are executed by the processor to cause the apparatus to perform operations including:
determining a random access preamble from at least one 2-step random access preamble;
performing 2-step random access by using the random access preamble;
performing 4-step random access in response to a failure of the 2-step random access, by using any random access preamble in one or more groups of random access preamble groups comprising the random access preamble used in the 2-step random access; and
wherein the determining the random access preamble from the at least one 2-step random access preamble comprises:
in response to a reference signal whose corresponding reference signal received power (RSRP) is greater than a first signal strength threshold existing in at least one reference signal configured by a network device, selecting a target reference signal from the reference signal whose corresponding RSRP is greater than the first signal strength threshold, wherein the reference signal is a synchronization signal block;
determining whether a first group of random access preambles are configured, wherein a data sending amount supported by the first group of random access preambles is greater than a data amount threshold; and
in response to the first group of random access preambles being configured, an amount of to-be-transmitted data being greater than the data amount threshold, and the to-be-transmitted data being carried on a common control channel, determining the random access preamble from at least one random access preamble that is in the first group of random access preambles and that corresponds to the target reference signal;
in response to the first group of random access preambles being configured, and an amount of to-be-transmitted data being less than or equal to the data amount threshold, determining the random access preamble from at least one random access preamble that is in a second group of random access preambles and that corresponds to the target reference signal.

8. The apparatus according to claim 7, wherein the operation of determining the random access preamble from the at least one 2-step random access preamble comprises:

in response to at least one reference signal whose corresponding reference signal received power (RSRP) is greater than the first signal strength threshold existing in at least one reference signal configured by a network device, selecting a target reference signal from the at least one reference signal whose corresponding RSRP is greater than the first signal strength threshold, wherein the at least one reference signal is a synchronization signal block;

determining whether a first group of random access preambles are configured, wherein a data sending amount supported by the first group of random access preambles is greater than a data amount threshold; and in response to the first group of random access preambles being configured, an amount of to-be-transmitted data being greater than the data amount threshold, and a path loss corresponding to the target reference signal being less than a value of PL2, determining the random access preamble from at least one random access preamble that is in the first group of random access preambles and that corresponds to the target reference signal;

wherein PL2=PCMAX−TP−Δ1−Δ2, PL2 is a second path loss threshold, PCMAX is a maximum transmit power of the terminal device in a cell in which the terminal device performs random access, TP is a target receive power of a random access preamble for the 2-step random access, Δ1 is a power deviation between the to-be-sent data and the random access preamble used in the 2-step random access, and Δ2 is a power deviation between the first group of random access preambles and a second group of random access preambles.

9. The apparatus according to claim 8, wherein the operations further comprise:
in response to the first group of random access preambles being not configured, determining the random access preamble from the at least one random access preamble that is in the second group of random access preambles and that corresponds to the target reference signal.

10. The apparatus according to claim 7, wherein the random access preamble used in the 2-step random access is one of the at least one 2-step random access preamble, and the at least one 2-step random access preamble corresponds to at least one group of random access preambles.

11. The apparatus according to claim 7, wherein the 2-step random access and the 4-step random access are used for initial data transmission.

12. The apparatus according to claim 7, wherein the operations further comprise:
receiving from the network device, configuration information which configures a random access resource corresponding to a synchronization signal block, wherein the random access resource is used for performing the 2-step random access or the 4-step random access.

13. A non-transitory computer-readable storage medium, wherein the storage medium stores a computer program or instructions, wherein the computer program or the instructions are executed by a computer to perform operations including:
determining a random access preamble from at least one 2-step random access preamble;
performing 2-step random access by using the random access preamble;
performing 4-step random access in response to a failure the 2-step random access, by using any random access preamble in one or more groups of random access preamble groups comprising the random access preamble used in the 2-step random access; and wherein the determining the random access preamble from the at least one 2-step random access preamble comprises:

in response to a reference signal whose corresponding reference signal received power (RSRP) is greater than a first signal strength threshold existing in at least one reference signal configured by a network device, selecting a target reference signal from the reference signal whose corresponding RSRP is greater than the first signal strength threshold, wherein the reference signal is a synchronization signal block;

determining whether a first group of random access preambles are configured, wherein a data sending amount supported by the first group of random access preambles is greater than a data amount threshold; and in response to the first group of random access preambles being configured, an amount of to-be-transmitted data being greater than the data amount threshold, and the to-be-transmitted data being carried on a common control channel, determining the random access preamble from at least one random access preamble that is in the first group of random access preambles and that corresponds to the target reference signal;

in response to the first group of random access preambles being configured, and an amount of to-be-transmitted data being less than or equal to the data amount threshold, determining the random access preamble from at least one random access preamble that is in a second group of random access preambles and that corresponds to the target reference signal.

14. The non-transitory computer-readable storage medium according to claim 13, wherein the determining the random access preamble from the at least one 2-step random access preamble comprises:

in response to at least one reference signal whose corresponding reference signal received power (RSRP) is greater than the first signal strength threshold existing in at least one reference signal configured by a network device, selecting a target reference signal from the at least one reference signal whose corresponding RSRP is greater than the first signal strength threshold, wherein the at least one reference signal is a synchronization signal block;

determining whether a first group of random access preambles are configured, wherein a data sending amount supported by the first group of random access preambles is greater than a data amount threshold; and in response to the first group of random access preambles being configured, an amount of to-be-transmitted data being greater than the data amount threshold, and a path loss corresponding to the target reference signal being less than a value of PL2, determining the random access preamble from at least one random access preamble that is in the first group of random access preambles and that corresponds to the target reference signal;

wherein PL2=PCMAX−TP−Δ1−Δ2, PL2 is a second path loss threshold, PCMAX is a maximum transmit power of the terminal device in a cell in which the terminal device performs random access, TP is a target receive power of a random access preamble for the 2-step random access, Δ1 is a power deviation between the to-be-sent data and the random access preamble used in the 2-step random access, and Δ2 is a power deviation between the first group of random access preambles and a second group of random access preambles.

15. The non-transitory computer-readable storage medium according to claim 14, wherein the operations further comprise:
   in response to the first group of random access preambles being not configured, determining the random access preamble from the at least one random access preamble that is in the second group of random access preambles and that corresponds to the target reference signal.

16. The non-transitory computer-readable storage medium according to claim 13, wherein the random access preamble used in the 2-step random access is one of the at least one 2-step random access preamble, and the at least one 2-step random access preamble corresponds to at least one group of random access preambles.

17. The non-transitory computer-readable storage medium according to claim 13, wherein the 2-step random access and the 4-step random access are used for initial data transmission.

* * * * *